(12) United States Patent
Mayer et al.

(10) Patent No.: US 10,018,326 B2
(45) Date of Patent: Jul. 10, 2018

(54) MULTIPLE BEAM SHAPING ILLUMINATION SYSTEM

(71) Applicant: Robert Bosch GmbH, Stuttgart (DE)

(72) Inventors: Tony Mayer, Vancouver (CA); Andrei Tsiboulia, Burnaby (CA)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 14/650,021

(22) PCT Filed: Dec. 7, 2012

(86) PCT No.: PCT/CA2012/050879
§ 371 (c)(1),
(2) Date: Jun. 5, 2015

(87) PCT Pub. No.: WO2014/085896
PCT Pub. Date: Jun. 12, 2014

(65) Prior Publication Data
US 2015/0323152 A1    Nov. 12, 2015

(51) Int. Cl.
*F21V 5/00* (2018.01)
*F21V 17/04* (2006.01)
(Continued)

(52) U.S. Cl.
CPC .............. *F21V 5/004* (2013.01); *F21V 5/007* (2013.01); *F21V 17/04* (2013.01); *F21V 17/06* (2013.01); *F21V 23/003* (2013.01); *G02B 26/0875* (2013.01); *G02B 26/0891* (2013.01); *G02B 27/0927* (2013.01); *G02B 27/0955* (2013.01);
(Continued)

(58) Field of Classification Search
USPC ........................................................ 362/235
See application file for complete search history.

(56) References Cited

U.S. PATENT DOCUMENTS

| | | | |
|---|---|---|---|
| 8,154,685 B2 | 4/2012 | Nakayama | |
| 2002/0195496 A1* | 12/2002 | Tsikos | B82Y 15/00 235/462.01 |

(Continued)

FOREIGN PATENT DOCUMENTS

| | | |
|---|---|---|
| GB | 2474921 A | 5/2011 |
| JP | 04313701 | 11/1992 |
| WO | 2008037049 | 4/2008 |

OTHER PUBLICATIONS

International Search Report for Application No. PCT/CA2012/050879 dated Aug. 28, 2013 (2 pages).

*Primary Examiner* — Michael G Lee
*Assistant Examiner* — David Tardif
(74) *Attorney, Agent, or Firm* — Michael Best & Friedrich LLP

(57) ABSTRACT

The invention provides a multiplicity of light sources—such as a planar array of LEDs—and a corresponding multiplicity of primary optic lenses, the primary optic lenses being curved and positioned to narrow a source light beam emitted from each of the light sources, and a beam shaper—which could be a beam shaping micro-refractive film or films, or a segmented refractor lens with multiple facets—that is shaped and positioned to receive a light source distribution emitted from the multiplicity of primary optic lenses and to emit an output light path having an angle of distribution different than a corresponding angle of the light source distribution.

24 Claims, 26 Drawing Sheets

(51) Int. Cl.
  *F21V 17/06* (2006.01)
  *F21V 23/00* (2015.01)
  *G03B 15/02* (2006.01)
  *G02B 27/09* (2006.01)
  *G02B 26/08* (2006.01)
  *H04N 7/18* (2006.01)
  *F21Y 105/10* (2016.01)
  *F21Y 115/10* (2016.01)

(52) U.S. Cl.
  CPC .......... *G03B 15/02* (2013.01); *F21Y 2105/10* (2016.08); *F21Y 2115/10* (2016.08); *G03B 2215/0589* (2013.01); *H04N 7/18* (2013.01)

(56) References Cited

U.S. PATENT DOCUMENTS

| | | |
|---|---|---|
| 2005/0286106 A1 | 12/2005 | Kimura |
| 2008/0156876 A1* | 7/2008 | Vinogradov ....... G06K 7/10732 235/462.01 |
| 2010/0200878 A1 | 8/2010 | Finger |
| 2011/0019404 A1 | 1/2011 | Chien et al. |
| 2015/0043053 A1* | 2/2015 | Satoh .................. G02B 26/007 359/290 |

* cited by examiner

MBS Illuminator - 60 Degree Horizontal Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 62 | 1.09 | 6.96E-04 | 94.9% | 64 | 1.24 | 0.02007 | 94.4% |
| 80% | 56 | 1.06 | 7.19E-04 | 88.8% | 35 | 1.13 | 0.02194 | 57.2% |

Standard Illuminator - 60 Degree Horizontal Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 46 | 1.23 | 7.26E-04 | 77.1% | 60 | 1.24 | 0.01798 | 79.3% |
| 80% | 26 | 1.07 | 8.29E-04 | 50.6% | 34 | 1.08 | 0.02067 | 52.3% |

MBS Illuminator - 30 Degree Horizontal Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 28 | 1.05 | 4.23E-02 | 92.1% | 30 | 1.09 | 0.04232 | 94.9% |
| 80% | 26 | 1.03 | 4.32E-02 | 87.6% | 26 | 1.04 | 0.04438 | 86.7% |

Standard Illuminator - 30 Degree Horizontal Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 26 | 1.22 | 3.58E-02 | 74.9% | 30 | 1.25 | 0.03488 | 78.2% |
| 80% | 14 | 1.07 | 4.09E-02 | 47.5% | 16 | 1.07 | 0.04058 | 49.9% |

MBS Illuminator - 20 Degree Horizontal Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 20 | 1.09 | 6.16E-02 | 95.3% | 20 | 1.09 | 0.06255 | 95.0% |
| 80% | 16 | 1.09 | 6.16E-02 | 82.8% | 16 | 1.02 | 0.06693 | 82.3% |

Standard Illuminator - 20 degree Horizontal Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 18 | 1.22 | 5.32E-02 | 75.5% | 20 | 1.26 | 0.05177 | 78.7% |
| 80% | 10 | 1.07 | 6.06E-02 | 49.8% | 10 | 1.07 | 0.06088 | 48.5% |

Fig. 3

MBS Illuminator - 60 Degree Vertical Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 40 | 1.09 | 4.08E-06 | 89.7% | 26 | 1.31 | 0.04952 | 69.1% |
| 80% | 32 | 1.03 | 4.34E-06 | 77.3% | 10 | 1.08 | 0.06044 | 36.2% |

Standard Illuminator - 60 Degree Vertical Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 62 | 1.22 | 3.52E-06 | 75.0% | 120 | 1.22 | 0.02173 | 88.0% |
| 80% | 36 | 1.07 | 4.00E-06 | 50.7% | 72 | 1.07 | 0.02465 | 60.5% |

MBS Illuminator - 30 Degree Vertical Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 34 | 1.10 | 7.60E-06 | 90.8% | 32 | 1.33 | 0.05198 | 86.6% |
| 80% | 28 | 1.04 | 8.05E-06 | 80.1% | 10 | 1.08 | 0.06385 | 37.5% |

Standard Illuminator - 30 Degree Vertical Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 46 | 1.23 | 4.51E-06 | 78.4% | 60 | 1.25 | 0.02650 | 80.1% |
| 80% | 26 | 1.08 | 5.16E-06 | 52.2% | 32 | 1.07 | 0.03080 | 51.1% |

MBS Illuminator - 10 Degree Vertical Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 32 | 1.09 | 2.38E-06 | 89.4% | 14 | 1.24 | 0.07411 | 59.1% |
| 80% | 28 | 1.05 | 2.47E-06 | 81.8% | 8 | 1.10 | 0.08389 | 41.8% |

Standard Illuminator - 10 degree Vertical Distribution

|  | Irradiance | | | | Intensity | | | |
| --- | --- | --- | --- | --- | --- | --- | --- | --- |
|  | FWHM | Pk/Avg | Avg | Efficiency | FWHM | Pk/Avg | Avg | Efficiency |
| 50% | 16 | 1.25 | 1.98E-06 | 79.0% | 20 | 1.28 | 0.07371 | 80.8% |
| 80% | 8 | 1.07 | 2.31E-06 | 51.1% | 8 | 1.06 | 0.08952 | 44.6% |

Fig. 4

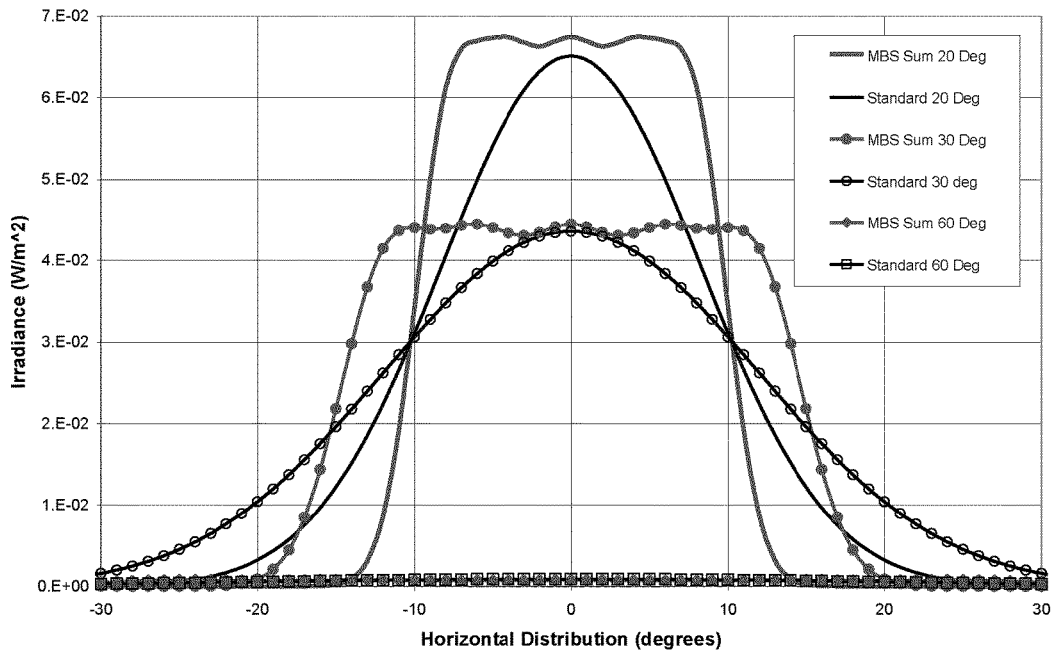
FIGURE 5A: Irradiance vs. Horizontal Distribution Comparison
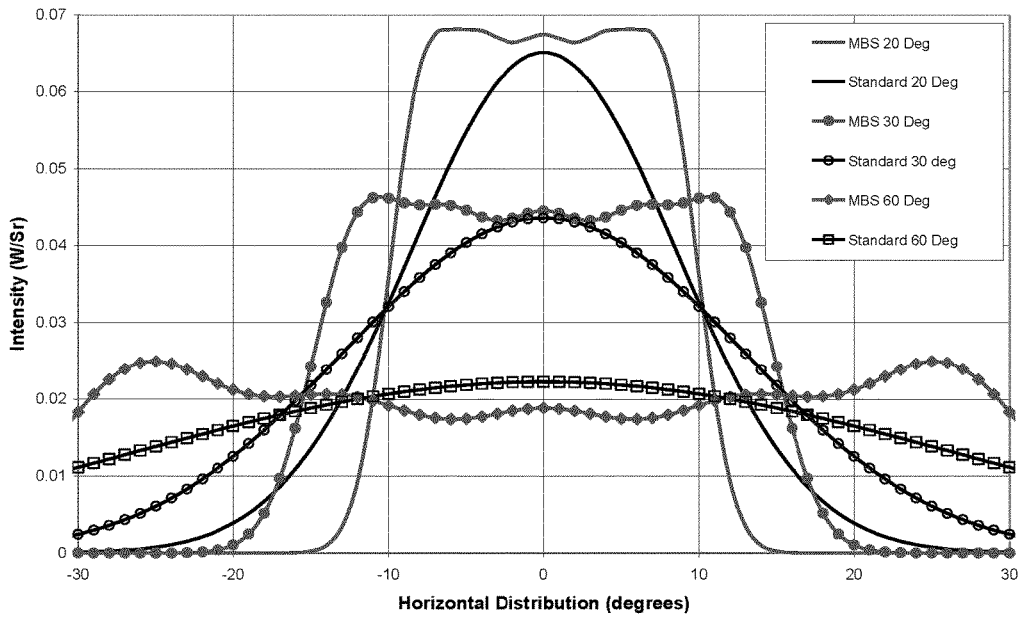
FIGURE 5B: Intensity vs. Horizontal Distribution Comparison

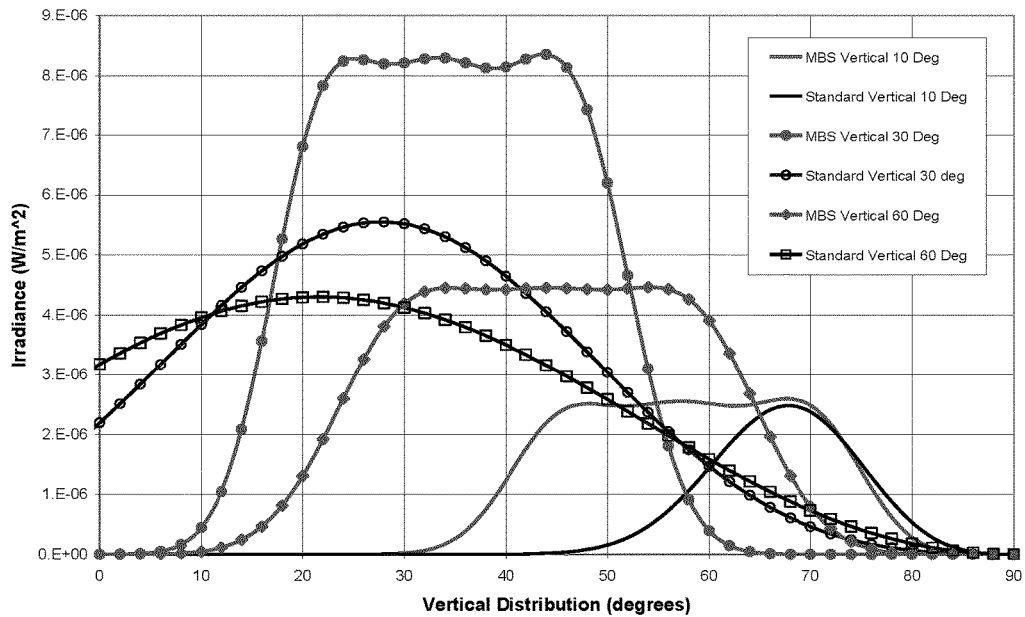
FIGURE 6A: Irradiance vs. Vertical Distribution Comparison
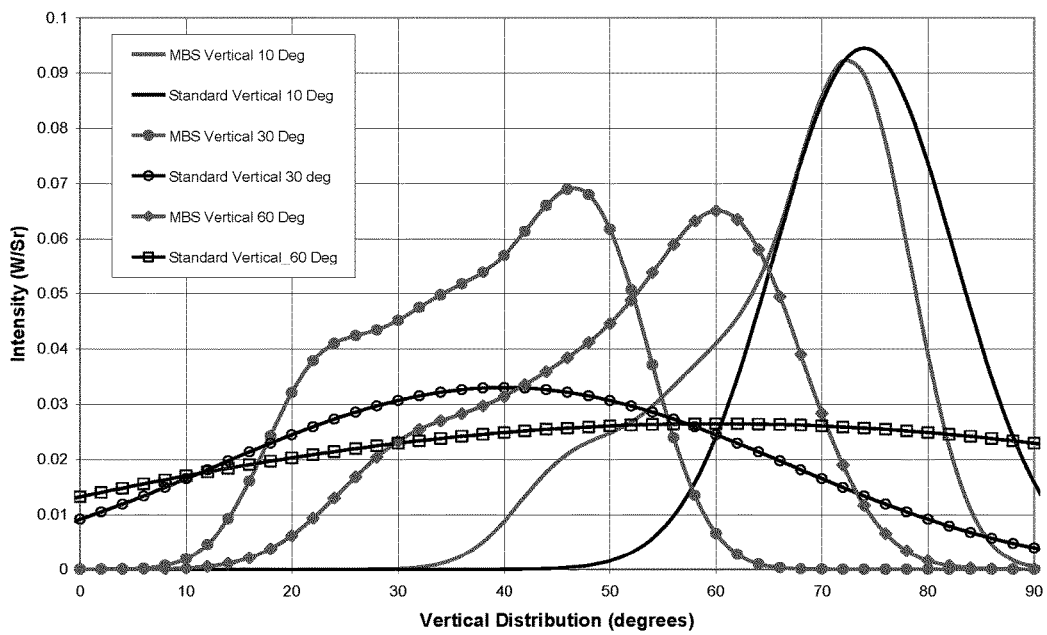
FIGURE 6B: Intensity vs. Vertical Distribution Comparison

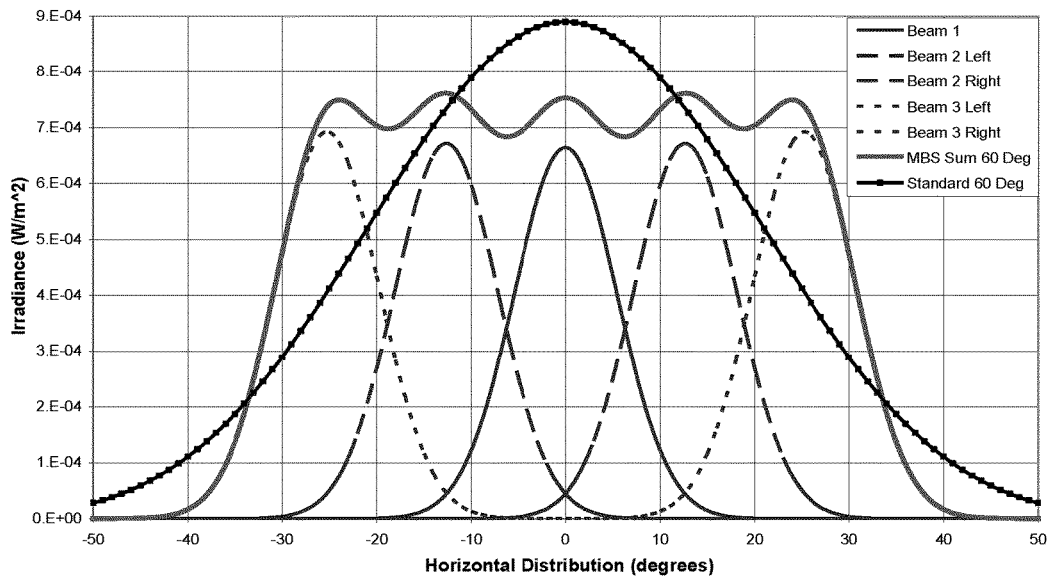
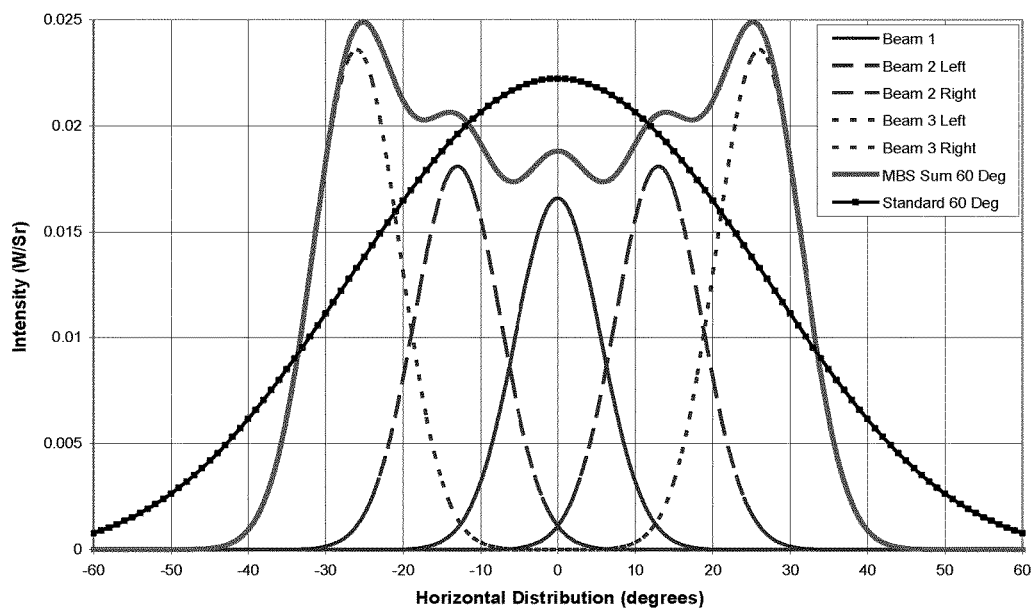

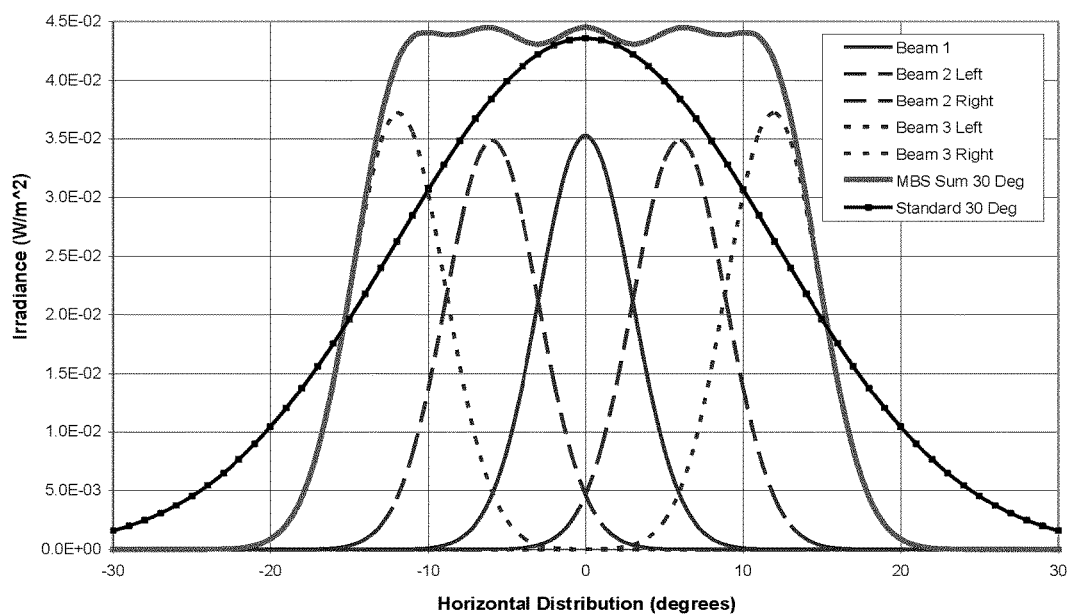
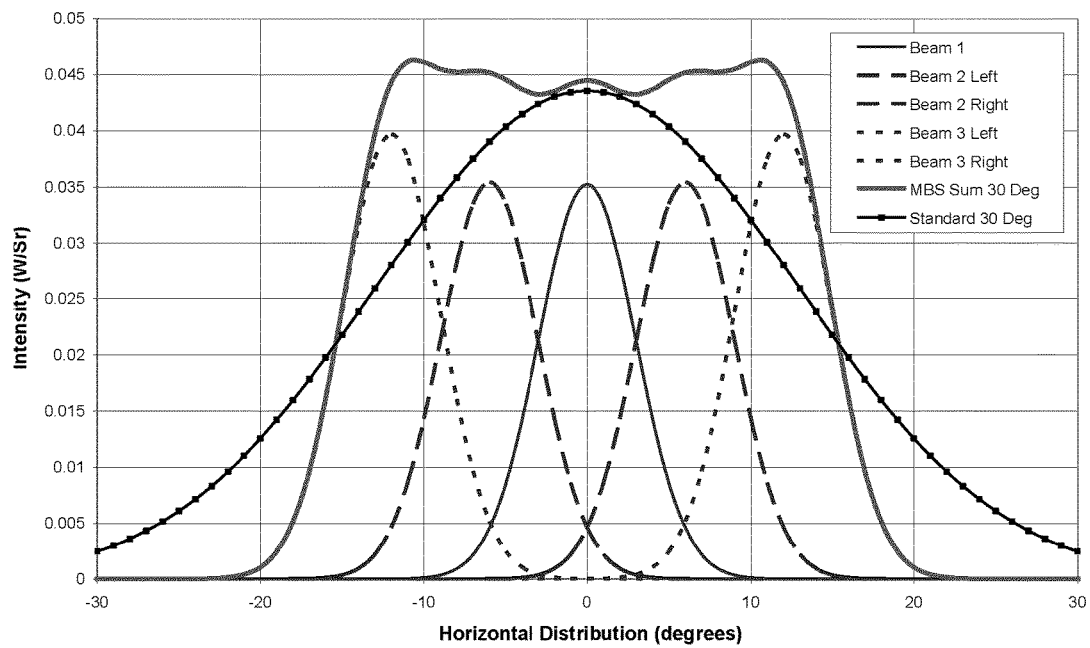

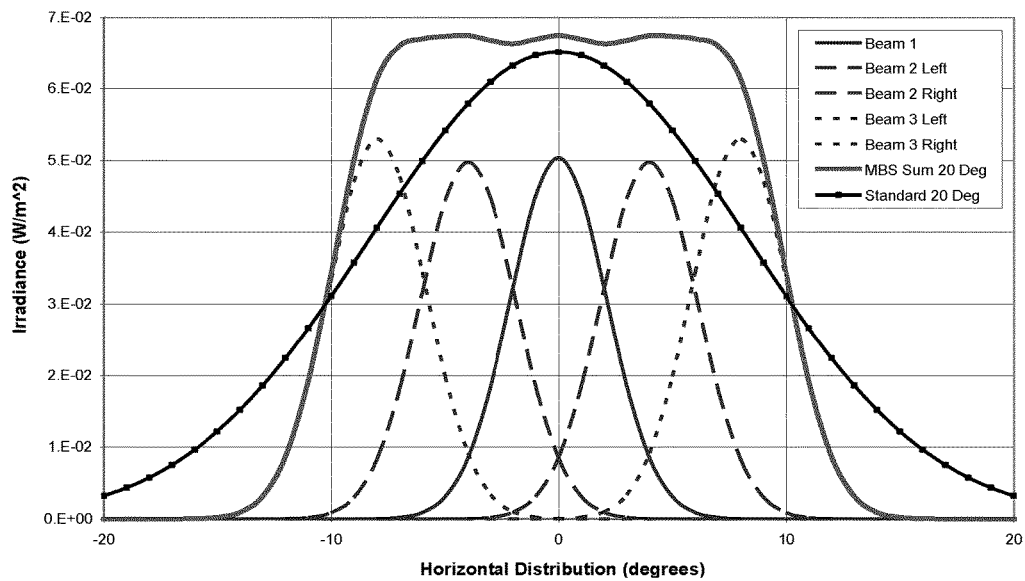
FIGURE 9A: Irradiance vs. Horizontal Distribution: 20 Degrees
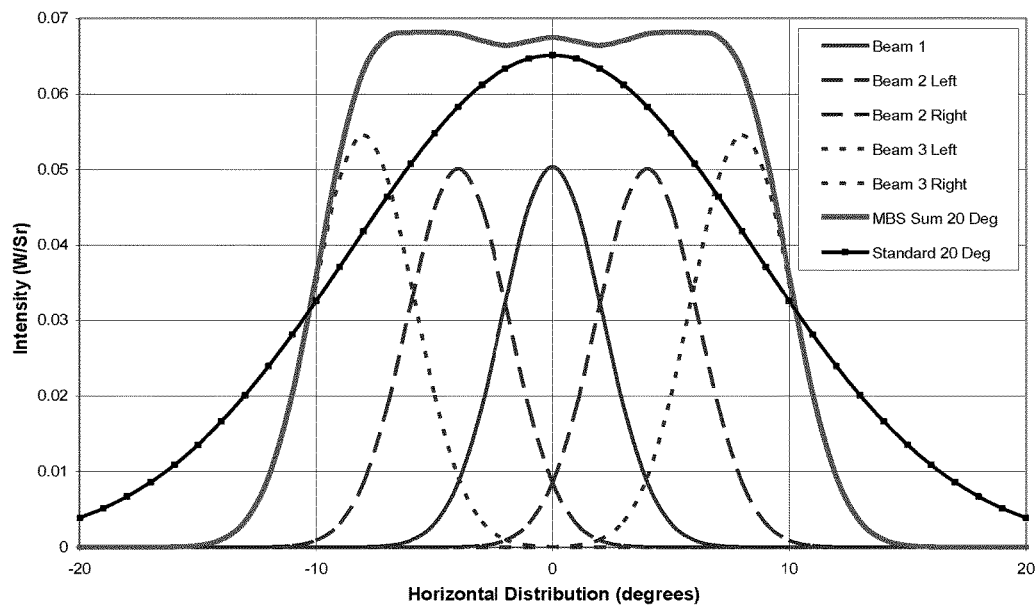
FIGURE 9B: Intensity vs. Horizontal Distribution: 20 Degrees

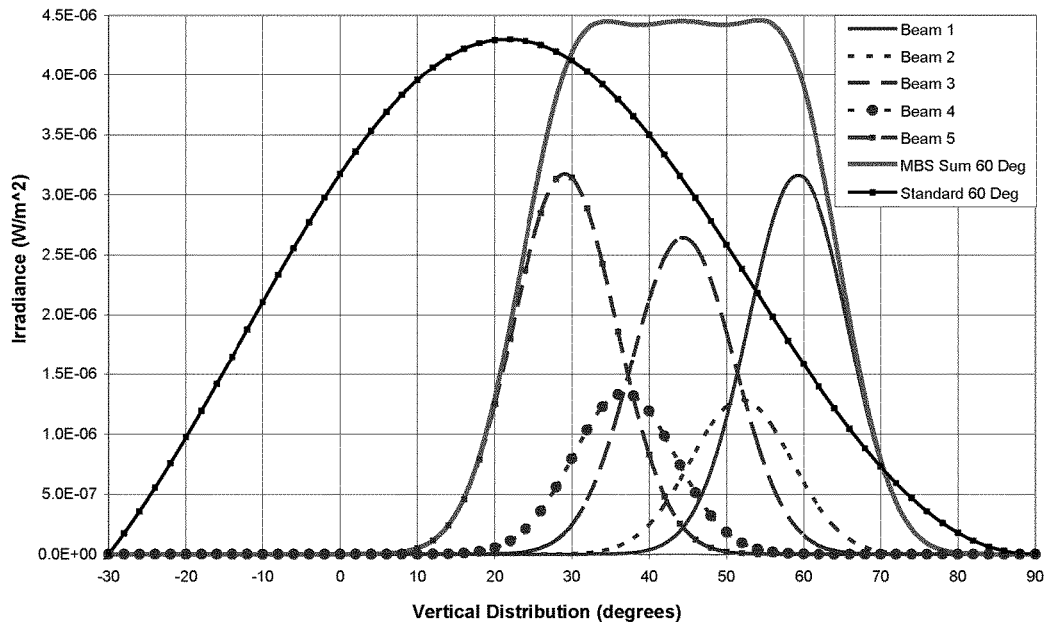
FIGURE 10A: Irradiance vs. Vertical Distribution: 60 Degrees
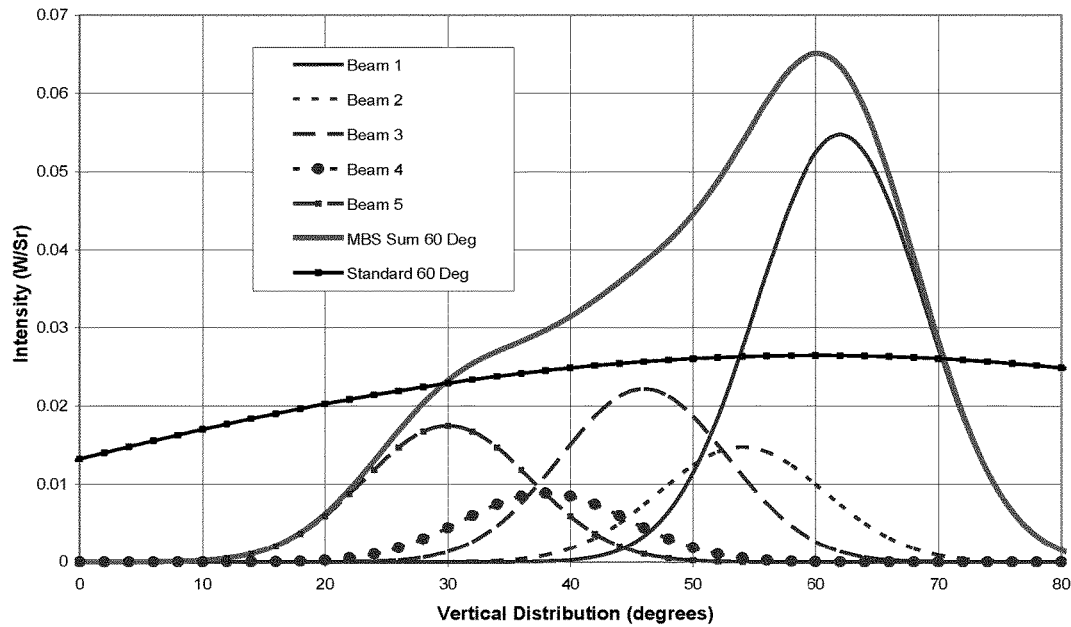
FIGURE 10B: Intensity vs. Vertical Distribution: 60 Degrees

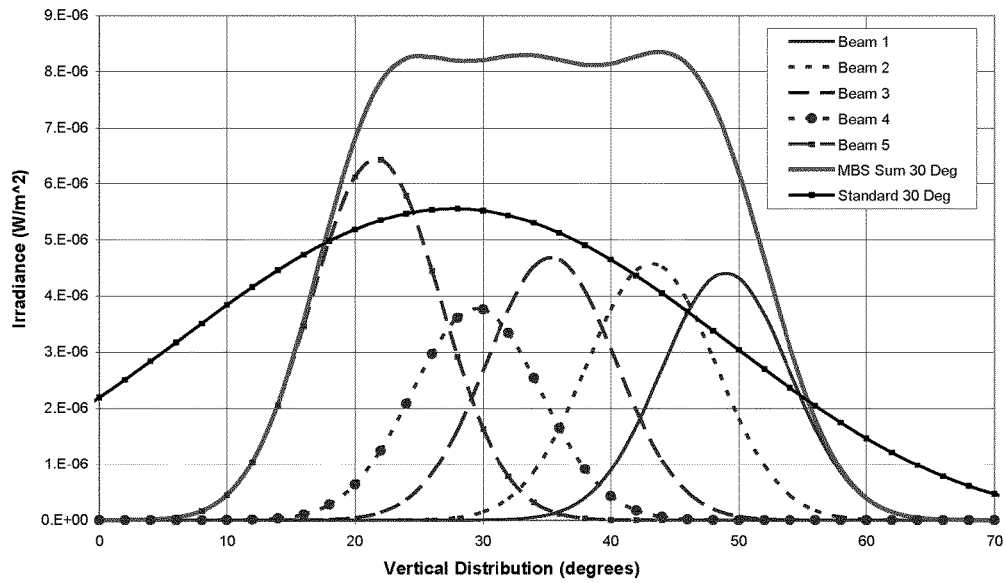
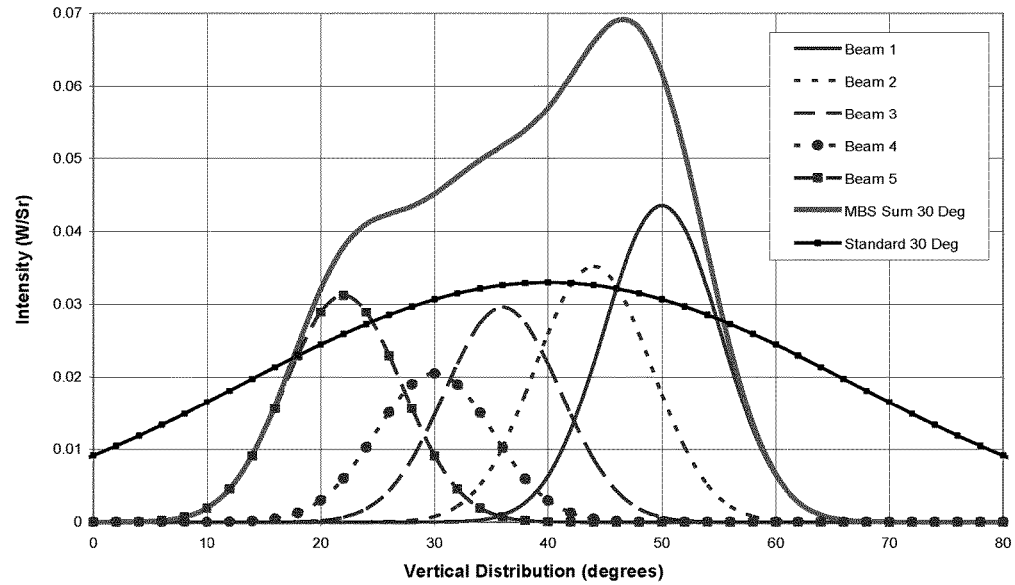

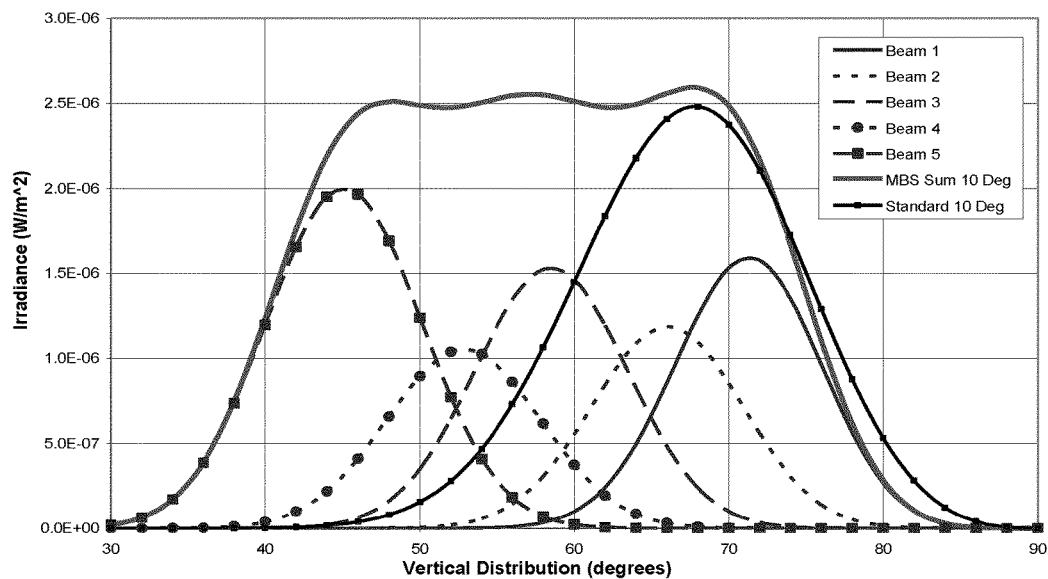
FIGURE 12A: Irradiance vs. Vertical Distribution: 10 Degrees
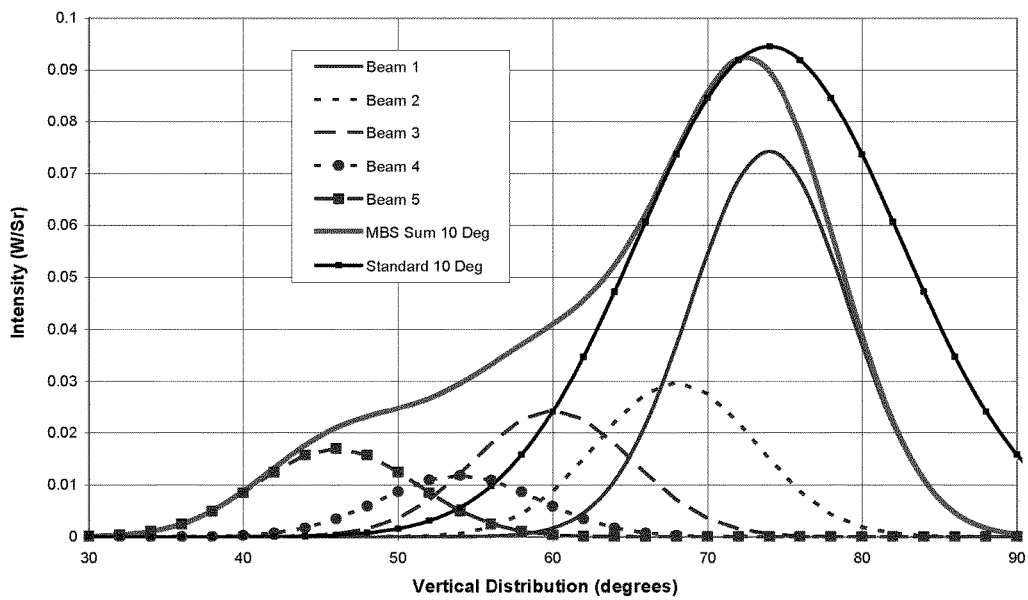
FIGURE 12B: Intensity vs. Vertical Distribution: 10 Degrees

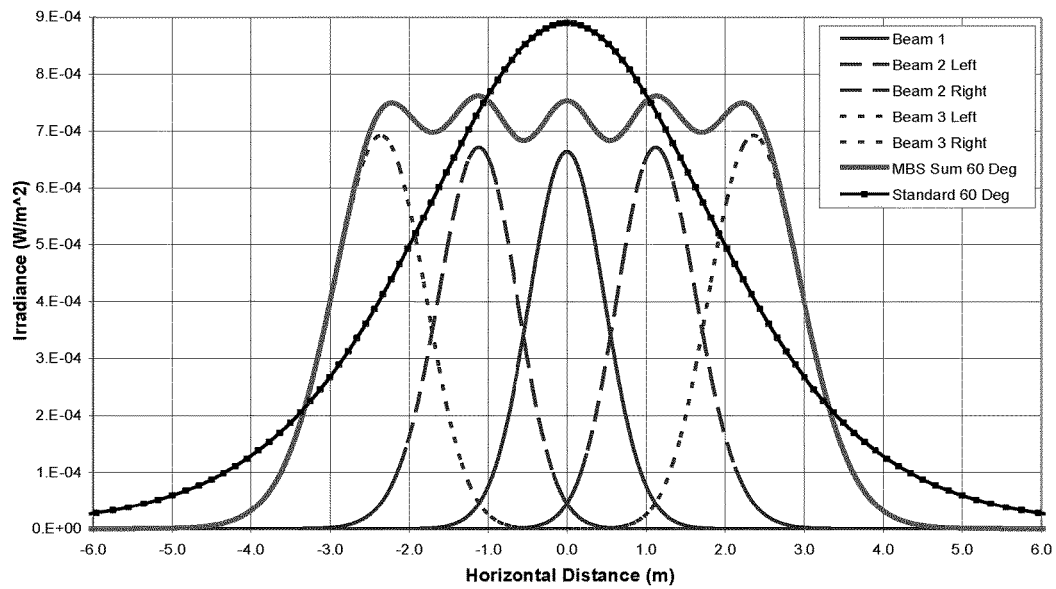
FIGURE 13A: Irradiance vs. Horizontal Distance: 60 Degrees
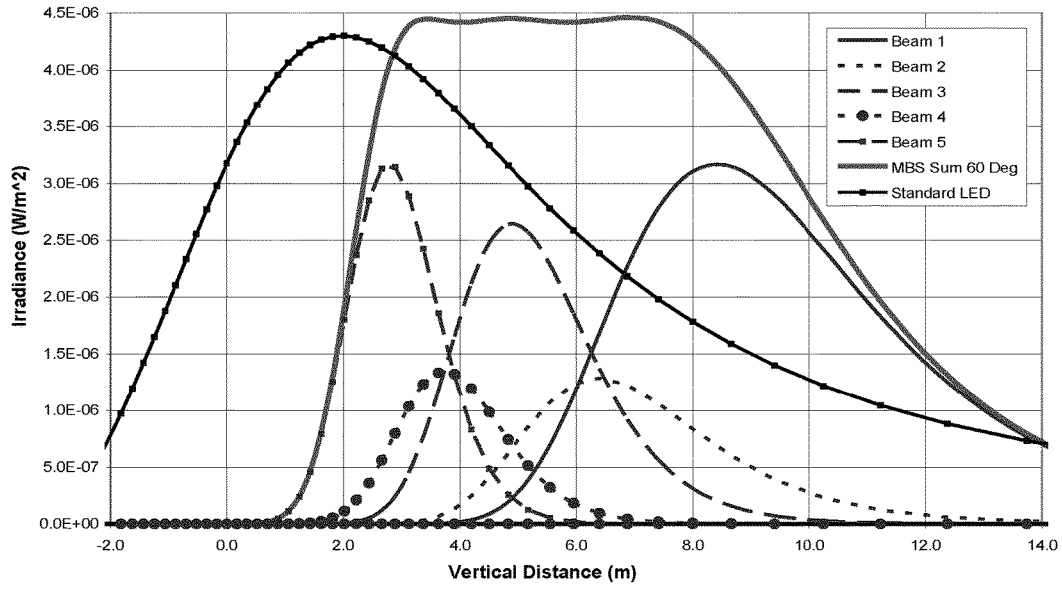
FIGURE 13B: Irradiance vs. Vertical Distance: 60 Degrees

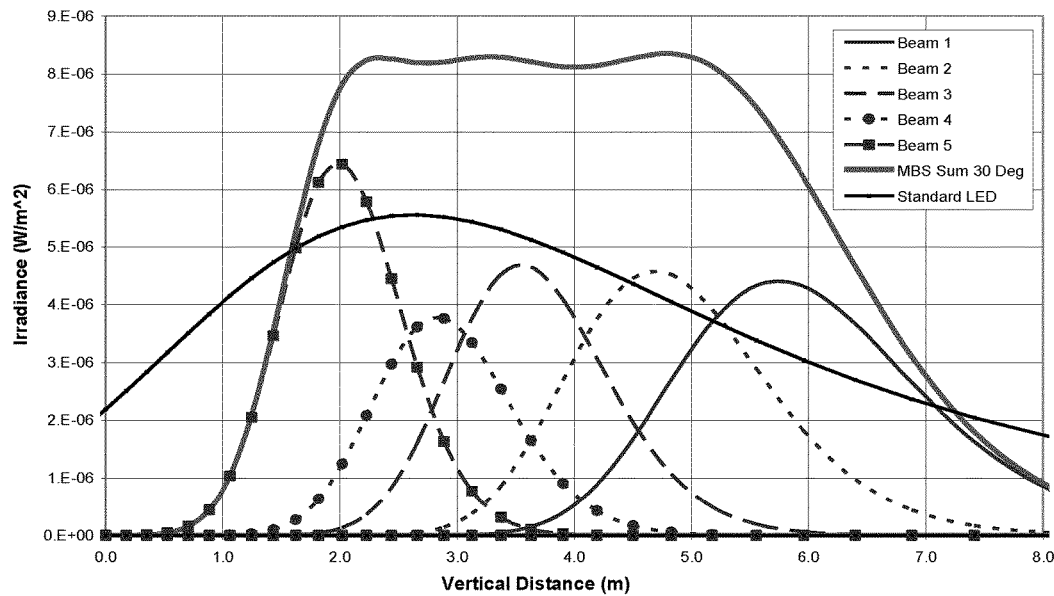
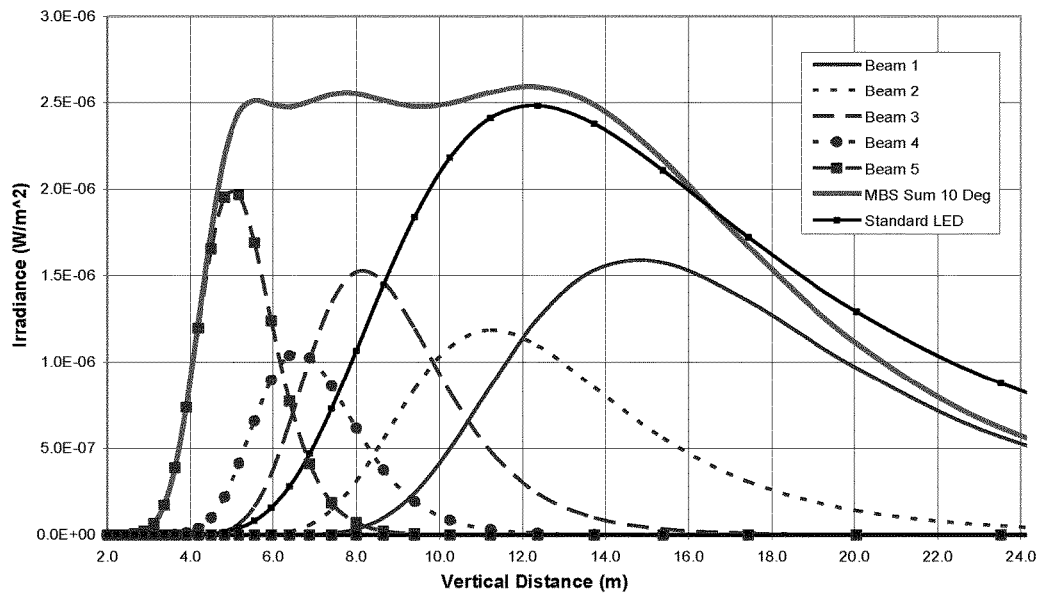

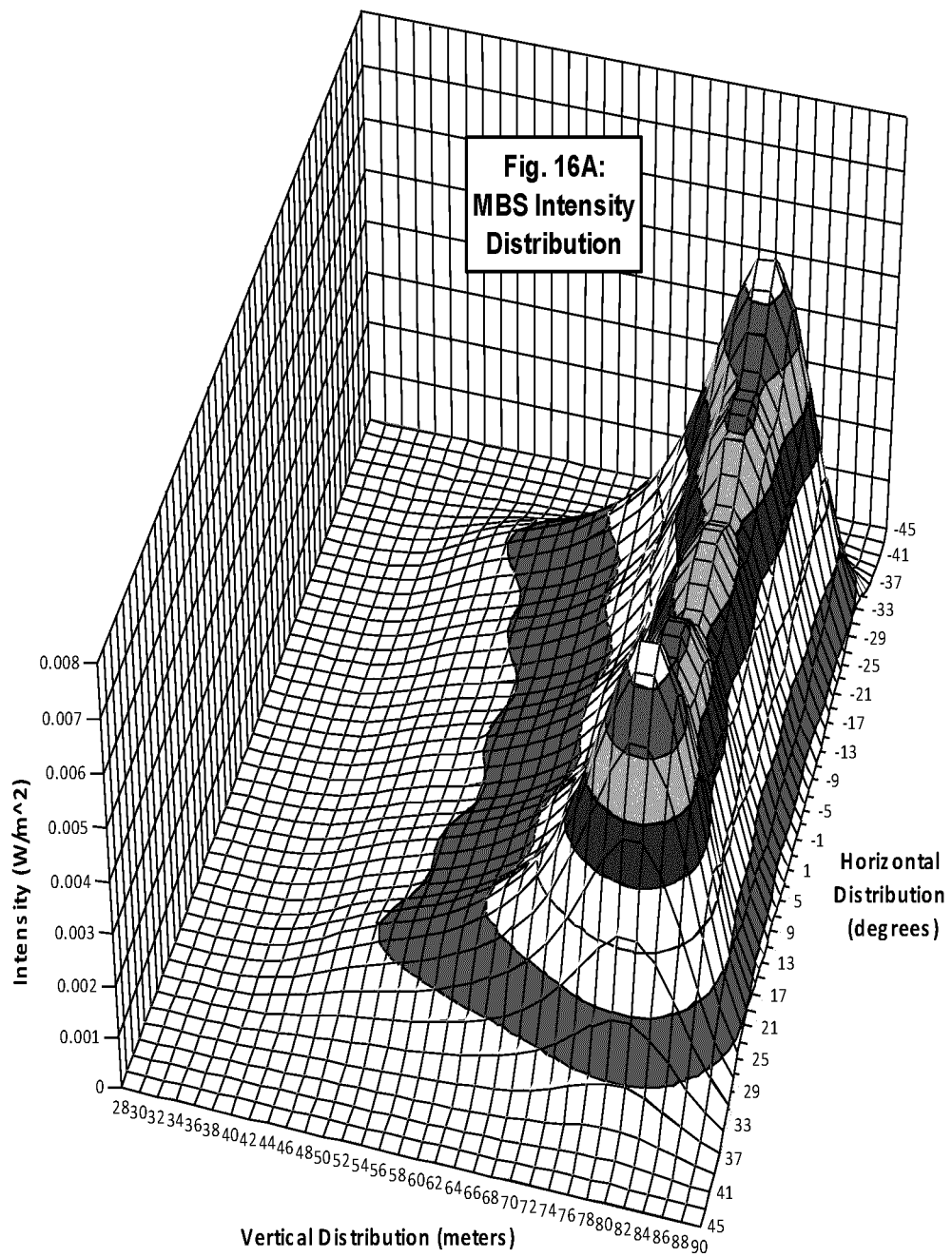

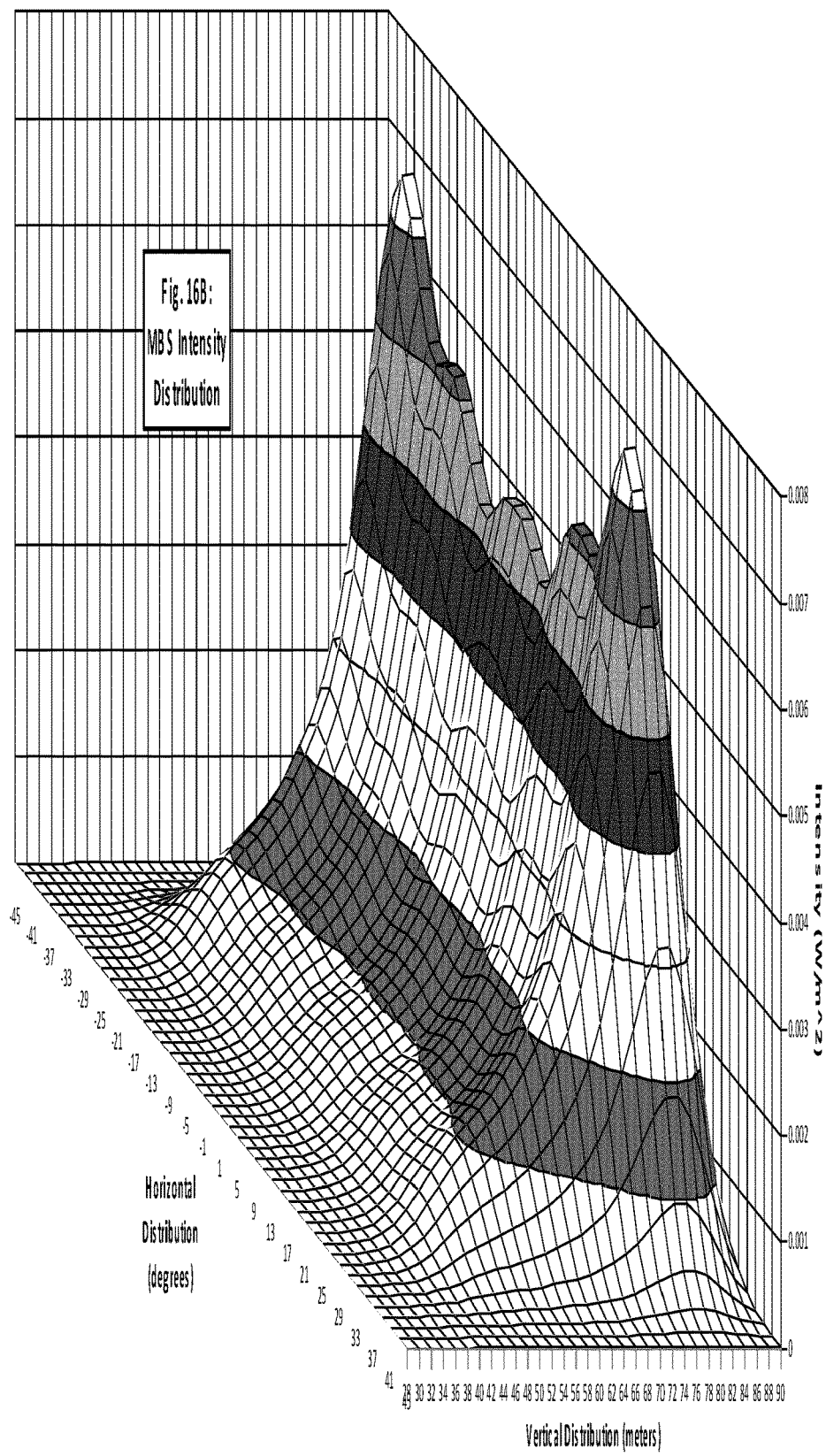

MULTIPLE BEAM SHAPING ILLUMINATION SYSTEM

FIELD OF INVENTION

This invention relates to the general field of optical systems, and specifically to an illumination modifier that delivers more light with increased uniformity to a specifically shaped target area, or one that requires a unique illumination pattern for optimal imaging. Such an illuminator could be useful for wide-angle long-range surveillance imaging of vehicle licence plates in multi-lane traffic, or for applications in any field with similar requirements where uniform or designable illumination over a target area is needed.

BACKGROUND OF THE INVENTION

A typical down range surveillance scene is not a single point in space, but is usually a horizontal panorama; one which requires sufficient illumination across its entire spread for optimal imaging. Also, most surveillance illumination has a vertical aspect that goes from foreground to background, so that a majority of its illumination must strike a target area that is angled below the illuminator mounting position, such as a pole or structure. A typical single illumination source delivers light with a circular Gaussian distribution, namely a central bright spot which then rapidly diminishes in intensity the further one is from its central axis. Since typical surveillance imagers are wide-angle in coverage, they require a wide-angle source which delivers uniform illumination across the entire imaging area, or target area. To one skilled in the art, it is clear that uniform illumination on a target area is an important aspect of image quality and one which allows the camera to extract the most information from a scene.

Due to the inverse square law of illumination, the intensity of light falling on a target area decreases in proportion with the square of the distance. For wide-angle illumination, distance to the middle of the horizontal area is considerably less than the distance to the edges. In order to compensate for the increased distance an illuminator must produce a horizontal intensity profile with strong bias towards these edges. The standard Gaussian illuminator intensity profile has the maximum at the center of the beam which is the opposite of that needed to create a uniform irradiance pattern over a target area. When using a camera and wide-angle lens arrangement to view a typical surveillance scene, a certain proportion of the image contains light traveling in the foreground, i.e., to the target area, and a certain amount that actually illuminates the target area. An optimal surveillance illumination system should deliver the maximum illumination evenly across the target area with minimal wasted energy falling outside the target area.

In addition, it is well known that a camera's dynamic range at night is determined by the range of signal it can pick up from the scene, and this ranges from the brightest object to darkest object the camera can detect. Under low light situations, or at night, the camera control algorithm will determine optimal parameters of exposure and gain, striving to maintain the highest quality image with the most dynamic range and therefore the most information in the image.

An ineffective illumination system with a peak to minimum ratio of 10:1 has a drastic impact on the usable information that can be extracted from the scene. A typical camera has 30-50 dB of dynamic range, and extended dynamic range cameras are being introduced to the market with dynamic range of 60 db to over 100 dB in some lighting conditions. Lighting can have the effect of reducing the effective dynamic range by 5-10 dB which is enough to make an ordinary camera with good illumination outperform an expensive high dynamic range camera with poor illumination.

The ideal situation is to combine a high dynamic range camera with an illumination system that provides very even illumination so the entire dynamic range of the camera can be utilized in extracting information from the scene instead of compensating for lighting irregularities.

Illumination systems that produce a circularly diverging beam require the installer to point the peak of the beam at the farthest target point. For a fixed target distance there is an optimum beam intensity profile in the vertical orientation. When viewing at the same distance with a wider and wider view and matching the circular illumination the illuminator moves further away from the optimum in the vertical orientation and wastes more light. Moreover, as the peak of the light source is pointed above the line of the target, a large proportion of the light is above the target area and is not utilized.

Microdiffractive light shaping diffuser (LSD) technology (WO2008037049) is a significant improvement in full-scene wide-area illumination by delivering light with an asymmetric Gaussian distribution enabling more even illumination on the target area, and less wasted light in the vertical plane than circular Gaussian sources. In spite of the elliptical distribution of LSD illuminators, they have similar energy waste outside the primary illuminated area, as with its circular distribution brethren.

Most video surveillance applications have the goal of achieving a uniform video signal for a particular target throughout a scene. Much effort has been made to increase sensitivity, improve spectral response to generate more signal with less light but little work has been done on imaging systems to actually produce a uniform image throughout the field of view. An active illumination imaging system is made up of the illuminator, camera and lens in the simplest form. It is important to understand that all three elements: the illuminator as well as camera lens and sensor have significant impact on the video signal produced.

A well known imaging phenomenon called vignetting describes the drop off of video signal from the center to edges of a scene. The result is that even under uniform illumination throughout a target area a sensor will produce a much higher signal in the middle than on the edges of the image. This effect is pronounced for wide angle views and low light situations where large aperture lens is often used.

With the prior state of the art surveillance illuminator technology, the illumination varies from the middle to edges of the scene by 20% while the video signal can have a difference of 100% of the video signal for the same target. Even with uniform illumination across a scene a difference of up to 35% of the video signal is observed for the same target in common situations.

SUMMARY OF THE INVENTION

The objective of this invention is to deliver a usable amount of very even illumination irradiance across a specifically shaped surveillance scene. The multiple beam shaping illuminator produces even illumination over a horizontal target area by modifying the illumination pattern so that illumination is very uniform horizontally across the scene, and also has a tailored vertical illumination profile that delivers the appropriate amount of light on scene both up close and in the distance.

The presently disclosed invention delivers more light on a scene with increased uniformity and improved efficiency. These advances are accomplished by an innovative method of reshaping the source illumination into multiple overlapping beams, thereby creating a unique three dimensional distribution that delivers even illumination when projected onto any target area.

To overcome vignetting, MBS Illumination can create beam intensity profile to deliver light distribution on scene to counteract inherent spatial video signal response so a camera can produce a signal much closer to the ideal uniform video signal. MBS can create an illumination profile to produce the spatial light distribution across a target area that is required to achieve uniform video signal by a camera for a given target.

The present invention provides a surveillance illuminator system in which a micro-refractive material generates multiple divergent beam manifolds from a multiplicity of discrete narrowly focused sources comprising the central manifold, and thereby evenly spreads the shape of original illuminator output over a much wider horizontal target area, as well as optimizing the vertical divergence for each surveillance environment. The illumination field produced has an extended horizontal shape that can be tailored to illuminate wide target areas, and projects a tailored vertical distribution intensity that places the maximum light energy only on the target area.

Essentially, the multiple beam shaping illumination system comprises a multiplicity of light sources—such as a planar array of LEDs—and a corresponding multiplicity of primary optic lenses, the primary optic lenses being curved and positioned to narrow a source light beam emitted from each of the light sources, and a beam shaper—which could be a beam shaping micro-refractive film or films, or a segmented refractor lens with multiple facets—that is shaped and positioned to receive a light source distribution emitted from the multiplicity of primary optic lenses and to emit an output light path having an angle of distribution different than a corresponding angle of the light source distribution.

The light distribution from the narrowed beams is of a shape that can be efficiently gathered. It is then shaped into a desired output path, for purposes of target illumination desired. In surveillance, the desired output light pattern is typically of a certain width, and height, with the illumination preferably wide and evenly distributed from left to right (roughly horizontal). In the vertical spread, it is often desired to have more light output up high than down low, in order to illuminate evenly both distant (from the vertically high output) and near (from the vertically low output) fields of view. The beam shaper is basically shaped and positioned to emit an output light path having an angle of distribution wider than a corresponding angle of the light source distribution. Preferably a central portion of the output from the beam shaper spreads its light wider than peripheral portions of the beam spreader, in order to correct the over-illumination of a central area on the target field of view that would result from merely beaming a normal Gaussian or near Gaussian elliptical light source distribution at the target.

The invention provides a Multiple Beam Shaping (MBS) illumination system for increasing uniformity of irradiance upon a selected target area, in which:
a) a beam shaper receives input distributions of light from at least one light source and emits output distributions of light having output pathway angles different than corresponding input pathway angles, the output distributions of light having essentially Gaussian intensity profiles;
b) the beam shaper has a multiplicity of light passage facets for a corresponding multiplicity of output distributions of light, at least two such facets being angled with respect to one another to effect a complementary overlapping of adjacent output distributions of light.

The complementary overlapping overlays a diminishing intensity area of one output distribution of light with its symmetrical counterpart of diminishing intensity of another output distribution of light. With the tails (or rings) of intensity profile overlapping sufficiently, in at least some areas of the complementary overlapping, the additive effect from the overlapped light beams can be made to equal the intensity of the peak intensity from either or both of the adjacent output distributions of light.

In this Specification, "essentially Gaussian" includes intensity profiles or light beams having theoretically Gaussian profiles and practically near-Gaussian observed or measured profiles, as well as intensity profiles and light beams that—although not having or showing a Gaussian pattern in the near field—become Gaussian or near-Gaussian in the far field.

Where a secondary lens is close to a primary lens for an illuminator, near-field optics apply within a range of approximately 10× the diameter of the light source. The "near field" and the "far field" of the light source are regions around the source where different aspects of the light radiation field are relatively more or less important. The boundary between the near field and the far field is not exact and depends on the dominant wavelength emitted by the source. Near-field light distribution may have a very different intensity output profile than "Gaussian" but does ultimately result in a Gaussian or near Gaussian profile in the far field.

A row or array of such output distributions and their respective Gaussian intensity profiles can be achieved by MBS such that each is partially overlapped with adjacent output distributions. Many diminished intensity areas of adjacent output distributions can thereby have an additive effect at the target that is substantially the same as that of the peak intensity center of each output distribution.

Moreover, in MBS, the center light output can be appropriately attenuated and spread by having the beam shaper shaped and positioned to refract some output distributions of light more than other output distributions of light, and thereby provide a particular overall output beam shape.

The light source can be a point or near-point source and the distribution of light is obtained from the source using one of a refractive lens or a micro-refractive film.

Preferably the system has a multiplicity of individual light sources and a corresponding multiplicity of primary refractive optic lenses positioned to narrow each of a corresponding multiplicity of individual source light beams, the beam shaper being shaped and positioned to emit an output light path having at least one angle of distribution wider than a corresponding angle of light source distribution.

To achieve a desired target illumination, in a preferred embodiment, the multiple beam shaping illumination system combines a variety of facets (in the case of segmented refractors being used) or several beam shaping films (having known light re-distribution characteristics), the beam shaper being thus shaped and positioned to emit a plurality of output light paths, including:
a) a plurality of upper output light paths,
b) a plurality of vertically central output light paths, and
c) a plurality of lower output light paths.

A more detailed preferred embodiment would include one in which:

a) the beam shaper is one or more sheets of micro-refractive film;
b) the multiplicity of light sources is a planar array of LEDs;
c) the primary optic lenses are mounted to an LED array frame in front of the LEDs;
d) the beam shaper is shaped and positioned to emit a plurality of output light paths from a plurality of planar arrays of LEDs;
e) the primary optic lenses are mounted to an LED array frame in front of the LEDs;
f) alignment pins and alignments holes are used to position the segmented refractor with respect to the multiplicity of light sources.

In a major variant of the system, the relative intensity of selected light paths can be changed by varying the drive current to change the resultant overall beam shape. The number of output light paths employed will directly depend on the shape of the intensity profile of illumination required. A preferred example would be one in which:

a) a current control module controls different electrical currents driving individual light sources to vary light output intensity among the individual light sources and to change thereby a resultant overall illumination beam shape;
b) there are multiple channels of light source current drive and the channels are controlled in light source groups to change relative light output of different light source groups, thereby providing change in shape of overall beam intensity profile;
c) a majority of light sources are controlled to draw optimal electrical power for a selected target area, but groups of individual LEDs used primarily for illumination of a foreground portion of the target area beams are controlled to draw less electrical power and provide less intense light output, thereby providing an electronic adjustment and aim for the beam shaper;
d) electronic control of light source drive current is performed across vertical groups of light sources while drive current across horizontal groups of lights sources remains constant, thereby providing an electronic adjustment to the illuminator angle of mount to suit particular camera and lens combinations.

In such a preferred variant of the MBS system, the illuminator beams would thus have controlled weights and controlled divergence. The divergence of the light beams is controlled by MBS to match up and overlap Gaussian distribution light beams to a substantial overall uniformity of illumination, while the irradiance weight of the light beams is controlled to shape the illumination intensity profile.

The multiple beam shaping illumination system is designed to be used in connection with a wide-angle surveillance camera having an aspect ratio sensitivity matching the light pattern produced by the illuminator. This novel combination represents a breakthrough for the quality of illumination for surveillance video and photography as it results in wide area illumination patterns without departing from the optimum energy distribution profile.

This invention results in the ability to produce an optimized extended horizontal illumination pattern enabling increased sensitivity for wide area photographic or video coverage, such as wide-angle views of multi-lane traffic; optimization of the vertical spread of illumination under the cosecant squared distribution for more efficient background illumination; in the reduction in the number of LEDs which would normally be used for a new angle configuration; and in reduced light pollution including non-visible light pollution.

This invention is useful in an intelligently secured transportation system, in which surveillance of a multi-lane roadway is performed with a mega-pixel camera having a wide-angle aspect, in conjunction with a mega-wide monitor. The MBS illuminator system provides less light where it is unneeded in the top or bottom of the field of view and more light in an extended wide area, and therefore conserves power. It also utilizes the available power and heat dissipation characteristics of the illuminator system's light source to effectively illuminate the wide-angle horizontal problem area and can provide better illumination even when compared to multiple standard illuminators. Less light overall is thereby needed to achieve ultra-high quality image capture of small target sub-sections of the scene because the light is more efficiently focused on the target sub-sections by means of the beam shaping material.

Multiple Beam Shaping (MBS) is ideal for distributed light sources such as an array or manifold of LEDs or LASER diodes (LDs). It is also possible to use a single LD with refractive lens and/or micro-refractive diffusers to create a distributed source, using MBS to create beams that have controlled weights in addition to controlled divergence. By employing a beam shaping film (BSF) that generates multiple angularly skewed beams which can be combined or intermixed, the multiple beam shaping (MBS) illuminator delivers an evenly distributed and energy efficient illumination across an entire down-range wide-angle scene, with significantly improved peak to average illumination levels over that of illuminators utilizing all previous Gaussian distribution methods. MBS provides even illumination and high energy efficiency necessary for CCTV surveillance imaging, and may have applications in many other fields where uniform or custom patterned illumination is desired and advantageous, such as general lighting applications as in street lighting where the peak to average and peak to minimum illumination levels are determined by mandatory regulatory standards. Multiple beam shaping delivers a custom shaped intensity profile that produces uniform irradiance over a wide-angle target area compared to standard illumination methods.

BRIEF DESCRIPTION OF THE DRAWINGS

FIG. 1a Top view of typical wide-area illuminator application, namely a licence plate capture across multiple lanes of hi-speed traffic.

FIG. 3 Horizontal Illumination Efficiency Data

FIG. 4—Vertical Illumination Efficiency Data

FIGS. 5a & 5b Comparison Plots of Irradiance and Intensity Data vs. Horizontal Distribution of 20, 30, & 60 degree sources.

FIGS. 6a & 6b—Comparison Plots of Irradiance and Intensity Data vs. Vertical Distribution of 10, 30, & 60 degree sources.

FIGS. 7a & 7b—Irradiance and Intensity Data vs. Horizontal Distribution of a 60 degree source.

FIGS. 8a & 8b—Irradiance and Intensity Data vs. Horizontal Distribution of a 30 degree source.

FIGS. 9a & 9b Irradiance and Intensity Data vs. Horizontal Distribution of a 20 degree source.

FIGS. 10a & 10b—Irradiance and Intensity Data vs. Vertical Distribution of a 60 degree source.

FIGS. 11a & 11b—Irradiance and Intensity Data vs. Vertical Distribution of a 30 degree source.

FIGS. 12a & 12b—Irradiance and Intensity Data vs. Vertical Distribution of a 10 degree source.

FIG. 13a Irradiance vs. Horizontal Distance of a 60 degree source.

FIG. 13b—Irradiance vs. Vertical Distance of a 60 degree source.

FIG. 14a—Irradiance vs. Vertical Distance of a 30 degree source.

FIG. 14b—Irradiance vs. Vertical Distance of a 10 degree source.

FIG. 16a 3D Plot of MBS Intensity Distribution for Horizontal Divergence vs. Vertical Distance ("over the shoulder" view).

FIG. 16b 3D Plot of MBS Intensity Distribution for Horizontal Divergence vs. Vertical Distance ("under the chin" view)

DETAILED DESCRIPTION

Figure 1A:
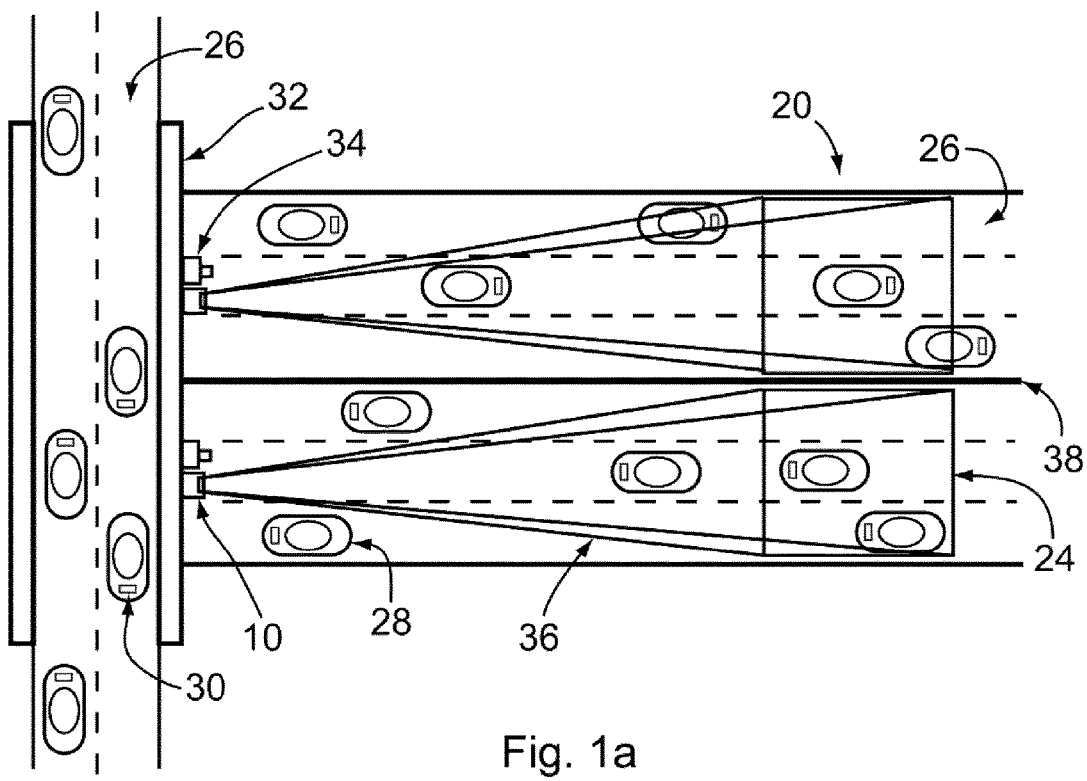
Figure 1B:
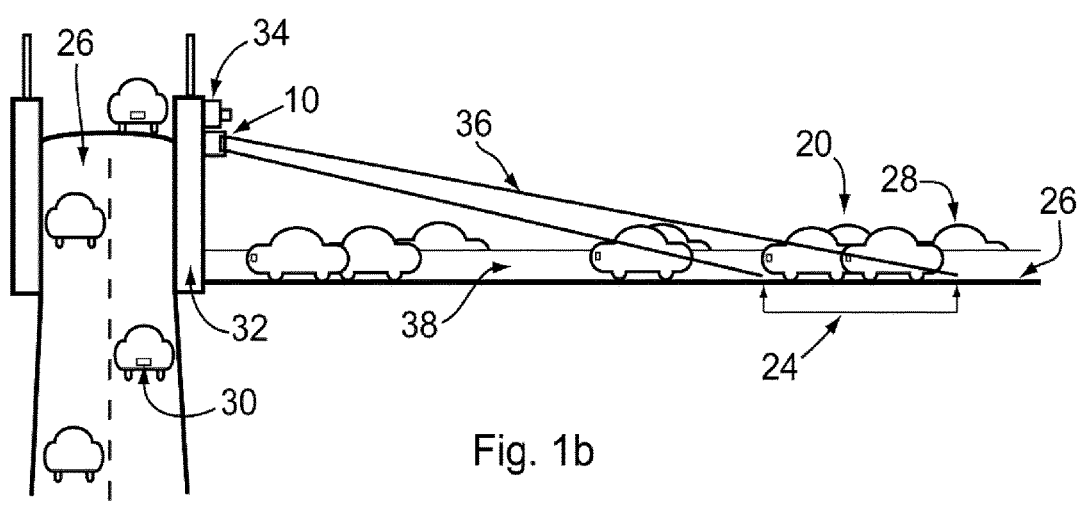
FIG. 1b—Side view of typical wide-area illuminator application, namely a licence plate capture across multiple lanes of hi-speed traffic.

FIGS. 1a & 1b show top and side views of a typical wide-area illuminator used in licence plate image capture across multiple lanes of hi-speed traffic. A multiple beam shaping (MBS) illuminator 10 is shown mounted to an overpass 32, above multiple traffic lanes 26, and adjacent to a surveillance camera 34 capable of capturing images from the entire downrange target area 20. In these examples, a low height highway divider 38 separates each set of traffic lanes 26. Direction of travel of vehicles 28 is indicated by reference to their rear licence plate 30. FIG. 1a shows the top view and FIG. 1b shows the side view of the illumination path 36 projecting only onto the target area 20 as shown by its target distribution 24 over the multiple traffic lanes 26.

Figure 2:
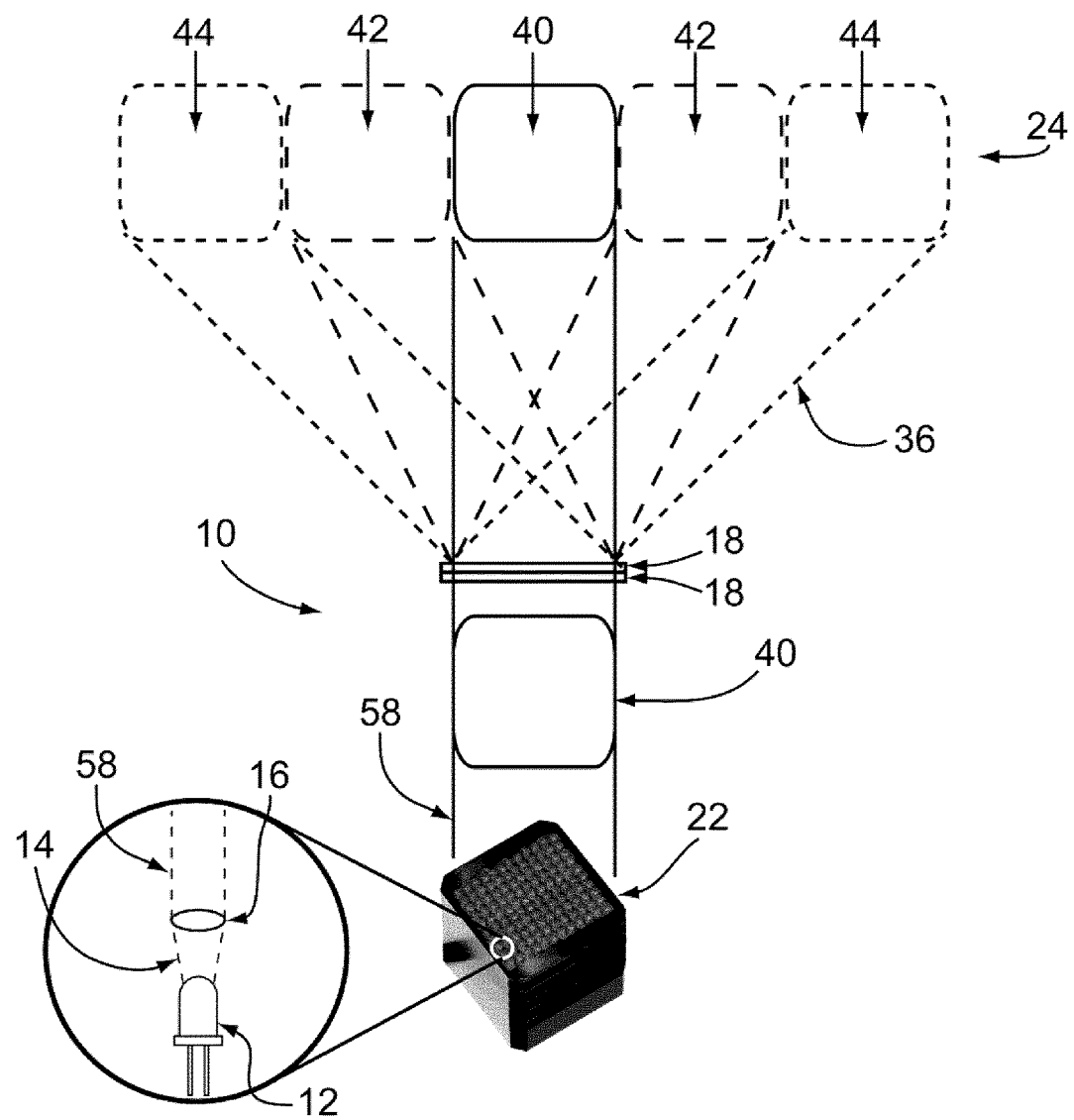
FIG. 2 Illustration of basic elements of multiple beam shaping.

FIG. 2 demonstrates the basic functional elements of the multiple beam shaping (MBS) illumination system 10 for horizontal intensity control. The source array 22 is comprised of a multiplicity of sources 12 such as LEDs or LASER diodes. The source beam 14 from a single source 12 (see magnified inset), may be modified by a lens 16 into a narrow beam 58 output. A multiplicity of narrow beams 58 combine to provide the source distribution 40 which shines through one or more beam shaping film(s) (BSF) 18. Light along the central axis will remain in the central region of the target distribution 24, as seen by the location of the source distribution 40. In this example, a single layer of beam shaping film (BSF) 18 spreads the source distribution 40 across the regions to the left and right which define the second order beam spread 42, which expands the target distribution 24 by the degree angle of the BSF 18. If the BSF 18 has a 20 degree beam spread, then the source distribution 40 is spread 20 degrees to the right and left, and the result is a target distribution 24 that can be approximately three times as wide. When a second BSF 18 is added on top of the first, the result is a third order beam spread 44 which is added to the first, providing a target distribution 24 that can be approximately five times as wide as the source distribution 40. Note that the solid lines tracing the illumination path 36 of the source distribution 40; the long dashed lines of the second order beam spread 42; and the shorter dashed lines of the third order beam spread 44, all correspond to similar line weights representing their respective beams on the horizontal distribution plots in FIG. 7a/b to 9a/b and the horizontal distance plots of FIG. 13a to follow. The BSF layers are partially overlapped in a stacked fashion.

FIGS. 3 and 4 provide tabulated horizontal and vertical efficiency data for the MBS illuminators compared with standard equivalent illuminators at different common angular divergent outputs. Both intensity and irradiance outputs are compared, as are Full Width at Half Maximum (FWHM), and Full Width at 80% Maximum (FW.8M), and peak to average ratios (PAR). These terms will be explained in more detail below.

The following graphical plots comprise both confirmed test results, and predicted results based on commonly proven optical theory applied to the horizontal and vertical aspects of multiple beam shaping illuminators 10. In most cases, each pair of graphs illustrate a sample set of five output beams that additively combine into a resultant uniform beam spread, each measured in intensity and irradiance. The first sets of plots or graphs compare only the MBS illuminator resultant (summed) output against a standard illuminator output, for representative distribution angles common to LEDs. Therefore, FIGS. 5a & 5b are comparison plots of irradiance and intensity data vs. horizontal distribution of 20, 30, & 60 degree sources. And FIGS. 6a & 6b are comparison plots of irradiance and intensity data vs. vertical distribution of 10, 30, & 60 degree sources.

The following plots (FIG. 7a/b to 9a/b) show horizontal distributions for each beam angle, which directly corresponds to the optical elements in FIG. 2. For example, as demonstrated graphically by FIG. 7a Beam 1 corresponds (thin solid plot line) with the source distribution 40 in FIG. 2; Beams 2 (left & right) correspond (wide dashed plot line) with the second order beam spread 42, and Beams 3 (left & right) correspond (short dashed plot line) with the third order beam spread 44. In this example, the MBS Sum (resultant) of these beams in irradiance for a 60 degree source is compared with the irradiance output of a standard 60 degree illuminator. FIG. 7b shows an effectively equivalent, but not identical distribution for the summed intensity. Equivalent horizontal distribution plots are shown for 30 degree and 20 degree output angles in FIGS. 8a/b and 9a/b respectively.

Equivalent vertical distribution plots for irradiance and intensity are shown for 60, 30, and 10 degree sources in FIG. 10a/b to 12a/b. Note that in these vertical plots, the axis of both standard and MBS Sum outputs are offset from zero degrees to the left on the graph, which in actuality means that the vertical distribution is offset towards the ground. The difference in offset is an artifact of the projected distance to the target area 20. For example, the position of the peaks of the resultant irradiance plot in FIG. 10A is a result of projecting an illuminator at an angle to the ground from an elevated mounting, such as the overpass 32 in FIG. 1a/b. The beam shaping film 18 creates a vertical deflection of the source distribution towards the ground, even though the illuminator is mounted perpendicular to the ground. This distribution profile is selected to provide the most uniform illumination when mounted at the proper height above the ground and aimed at the furthest point permitted by the output limitations of the illuminators.

Instead of relating angular divergences, the next set of plots relate projected distances of downrange illumination. FIG. 13a relates irradiance to its horizontal distance and FIG. 13b to its vertical distance, for a 60 degree source. FIG. 14a relates irradiance to vertical distance for a 30 degree source, whereas FIG. 14b does the same for a 10 degree source.

Figure 15A:
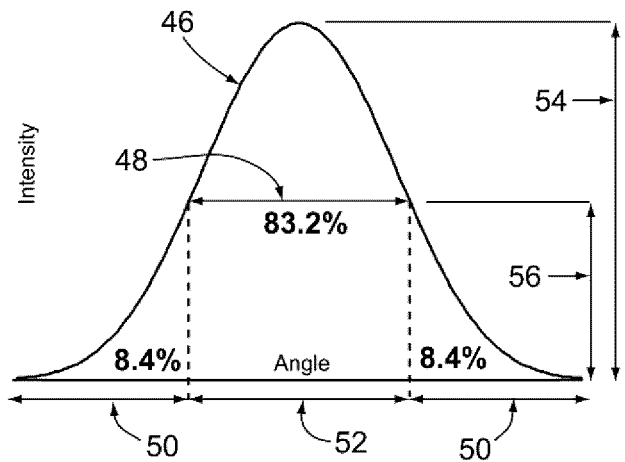
FIG. 15a Gaussian distribution illustrating FWHM angle.

FIG. 15a through 15d are used to explain the limitations of modifying light at the level of the individual source; an explanation which is necessary to understand how light can be shaped when employing a multiplicity of sources. FIG. 15a shows how to derive the FWHM angle 48 from a Gaussian curve 46 by measuring the percentage of illumination under the curve at half maximum 56 of the illuminator's maximum 54 output. The FWHM angle 48 defines the boundary of the region under the curve 46 and is called the pass band 52, and the remainder is called the stop band 50.

Figure 15B:
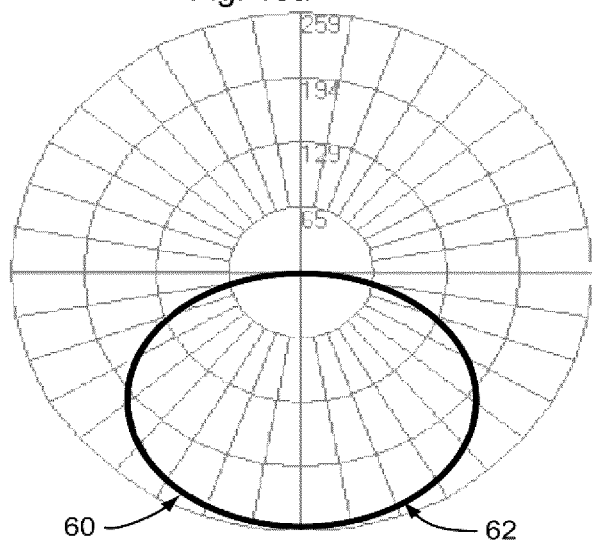
FIG. 15b Polar plot of Lambertian distribution of standard LED.
Figure 15C:
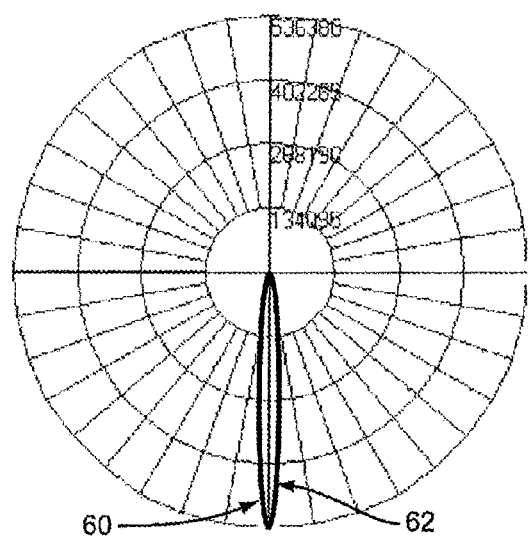
FIG. 15c Polar plot of narrowed LED distribution using lens.
Figure 15D:
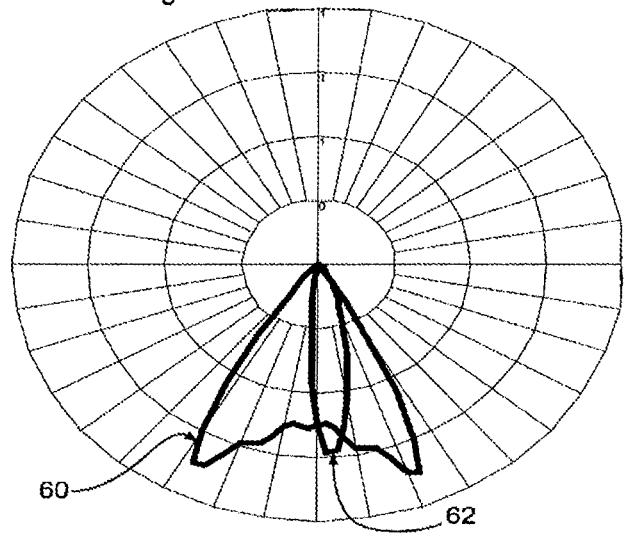
FIG. 15d Polar plot of horizontal beam spreading while retaining narrow vertical distribution.

FIG. 15b shows a polar plot of the Lambertian distributions of a standard LED in overlapping horizontal and vertical aspects. FIG. 15c shows a polar plot of a narrow beam 58 distribution created when the output of a source 12 LED is narrowed with a refractive lens 16 (overlapping H & V aspects). FIG. 15d shows a polar plot of horizontal distribution 60 and the slightly downward offset of the narrow beam vertical distribution 62 as modified by MBS methods. The vertical offset is designed to provide uniform spatial irradiance distribution from foreground to background.

FIGS. 16a & 16b show a 3D plot, from two complimentary directions, of the MBS Intensity Distribution for Horizontal Divergence vs. Vertical Distance ("over the shoulder" and "under the chin" views). These views summarize and illustrate the result of multiple beam shaping to create tailored illumination precisely matching the target requirements.

Figure 17:
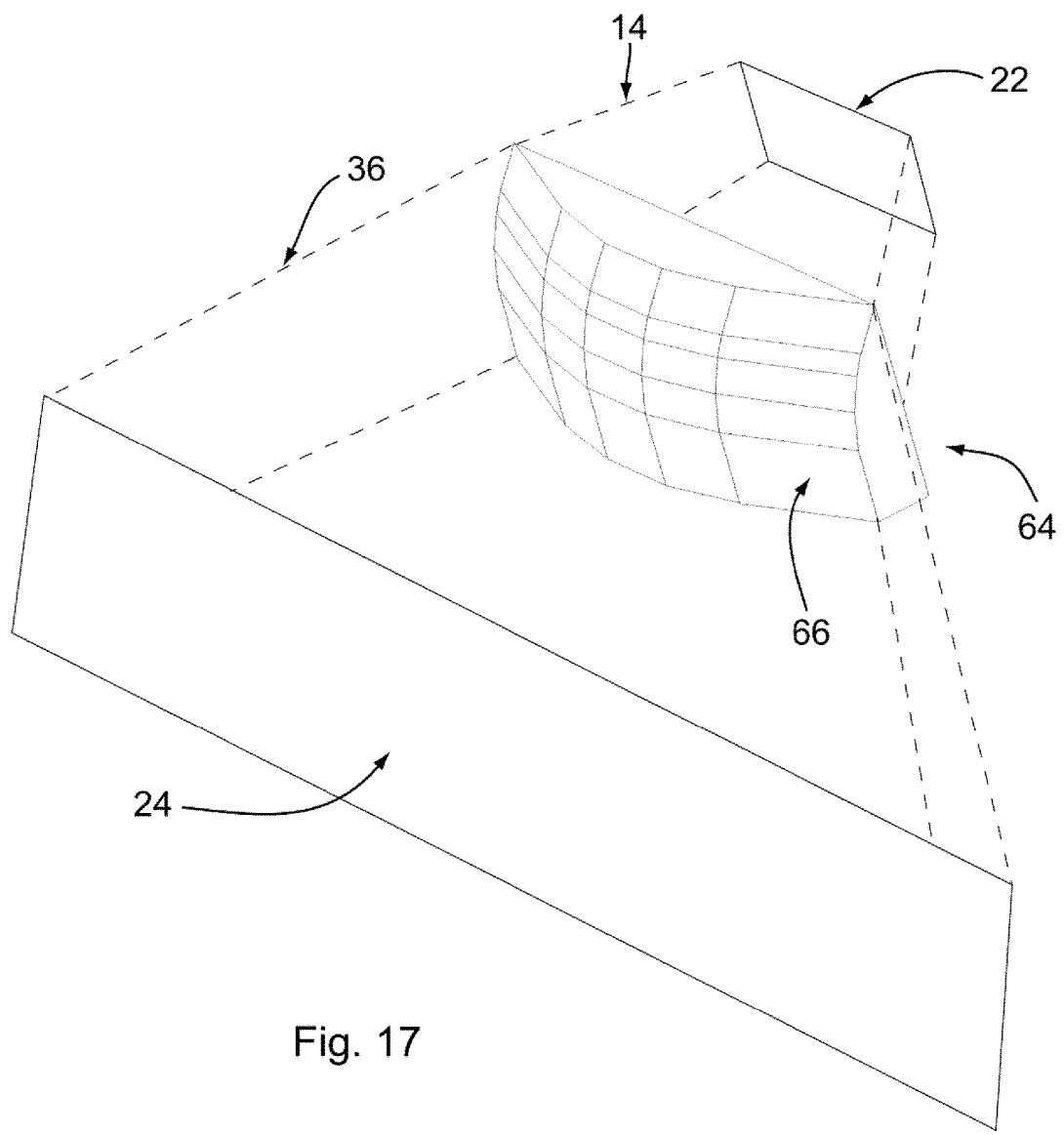
FIG. 17 Isometric view of a segmented refractive lens with its beam shaping facets (alternate embodiment).

FIG. 17 shows an alternate MBS lens embodiment, namely a segmented refractor 64, with its beam shaping facets 66. FIG. 17 illustrates the beam shaping effect whereby the source array 22 shines beams 14 onto the segmented refractor 64, which are then shaped by its facets 66 (and corresponding refractive divergences) and sent by means of the illumination pathway 36 to the target distribution 24.

The preferred embodiment of the multiple beam shaping illumination system 10 will now be described in detail.

A standard LED source 12 emits a Lambertian distribution (evenly scattered) as shown in FIG. 15b. This is very wide dispersion with some uniformity in both horizontal and vertical directions. This distribution is very inefficient, with both substantial energy losses and a projection that provides very little illumination where it is actually needed, i.e. on the target area 20. A common solution to increase efficiency is to narrow the source beam 14 with a refractive lens 16 or some equivalent means, but this limits the FOI to a very small area which is impractical for surveillance purposes (see FIG. 15c). The use of microdiffraction or equivalent means to spread the beam across a wider area creates an elliptical Gaussian distribution. As mentioned above, Gaussian distributions create hot spots at the peak illumination in the center of the target area, and do not illuminate the surrounding areas sufficiently for optimal surveillance imaging. FIG. 15d shows an MBS illuminator intensity profile demonstrating how an LED source distribution can be shaped horizontally and vertically.

Evenly distributed and efficient illumination is a primary object of this invention, therefore methods of quantifying these parameters are needed, and two common optical units are available, namely Peak to-Average Ratio (PAR) and Full Width at Half Maximum (FWHM). These units help quantify MBS efficiencies when compared to standard Gaussian illuminators.

Illumination from a standard LED panel will tend to produce a near Gaussian distribution in both horizontal and vertical aspects, which isn't the optimal distribution due to the relatively small region of flat illumination at the central axis (the hot spot) that then slowly diminishes. This creates suboptimal imaging with cameras because it causes them to overexpose in the hot spots and underexpose in the poorly illuminated areas. A metric used to quantify "evenness of illumination" is the peak-to-average ratio (PAR). This ratio explains the behavior between the average irradiance given off by an illuminator compared to its peak irradiance. Peak intensity is normally at the center of Gaussian distributions, but may not necessarily be so with MBS distributions. The closer this PAR is to one, the more even is the distribution of light. PAR is derived by the following ratio:

$$PAR = \frac{\text{Peak Irradiance} \left(\frac{\mu W}{cm^2}\right)}{\text{Average Irradiance} \left(\frac{\mu W}{cm^2}\right)}$$

PAR implies that the ideal distribution curve with optimal evenness would be one which is flat across its peak, with perpendicular sides that slope off only past the half maximum line. This would result in the most efficient and even distribution.

Another reason that Gaussian distributions aren't efficient is that they waste a relatively large amount of the power spectrum. As shown in FIG. 15a, this waste can be quantified by the Full Width Half Maximum (FWHM) rule that states whatever the shape of the distribution curve, if one measures the full width of the curve at half maximum 56 intensity, the useable illumination is in the pass band 52 region, and the waste is in the stop band 50 region. In standard Gaussian distributions, approximately 25% of the total power is located outside of the pass band 52 region. This waste can be reduced, but usually at the expense of making the pass band 52 less even. Multiple beam shaping 10 is a novel solution that projects the maximum pass band 52 illumination onto a target area 20 and can provide a more even target distribution 24 than standard Gaussian illuminators.

There are two common aspects of MBS 10 technology, namely symmetric horizontal diffusion which produces even horizontal illumination across the scene and asymmetric vertical diffusion which provides a vertical distribution with more even illumination from the foreground to the background and which wastes less energy by not diffusing light away from the target area 20.

Beam spreading is defined as light divergent in either the horizontal or the vertical plane, whereas beam shaping is when divergences of multiple beams in one or both planes with specific relative weights are combined to create a specifically shaped target distribution with the object of optimizing target irradiance. With beam shaping, we are able to generate any number of beams, with any relative weighting and in one or two directions i.e. either or both horizontal and vertical intensity patterns in order to create any illumination profile desired. The effect of horizontal and vertical beam spreading is additive. To achieve the objective of delivering uniform illumination over wide-angle downrange target area, the horizontal and vertical aspects of beam shaping need to be considered separately. Each orientation has unique requirements to achieve even illumination, which can then combine to produce substantially uniform illumination over the target area. We will begin by describing in detail the functionalities and advantages of horizontal beam spreading, then the unique aspects of vertical beam spreading, and finally the combined capabilities of a multiple beam shaping illuminator system 10.

Horizontal Beam Spreading

The symmetric horizontal aspect of MBS illumination 10 is the ability to spread the beam from the originating source beam 14 into multiple distinct beam spreads (42, 44) that are preferentially bent to a range of horizontal angles. The larger the number of beams in the fan and the closer they are together the more uniform the resultant beam will be and therefore the more uniform the light will be across the scene.

A number of methods can be used to deliver this beam fan. One such method is to use a reflective surface that is configured to generate multiple beams or a continuous beam for a particular beam angle. Another method is the use of multiple direction turning film with different divergences to 'turn' the originating source beam. Applying multiple divergences, symmetric with the center axis will produce the desired beam fan. Microdiffractive filters may be applied to the beam fan to blend the rays delivering a more uniform illumination.

FIG. 1a illustrates the horizontal application of an efficient and evenly distributed wide-angle illumination system, and FIG. 1b illustrates its vertical aspect. In order to simultaneously image moving vehicles 28 across multiple traffic lanes 26, one needs to project the majority of the available illumination on the target area, with the least waste of energy. In this example, projecting visible light into oncoming traffic would pose a safety hazard, so the illumination needs to remain in the target area at all times. Although, infrared illumination would probably be used in this application, thereby precluding this deficiency, in other applications restricting illumination solely to the target area for safety reasons may be of paramount importance. In order to achieve this object, an illumination system must shape its output to the target area as shown in FIGS. 1a & 1b and this requires a method of optimizing irradiance over a target area.

The MBS Illuminator 10 is a novel means used to create or modify multiple beams of equal or different relative intensities, originating from a single distributed source, and then additively combining them into a uniform target distribution 24 adapted to the unique requirements of a target area 20. FIG. 2 demonstrates this basic functionality by showing how a distributed source, and LED array 22, emitting a multiplicity of narrow beams 58, which are additively combined by one or more beam shaping films (BSF) 18, to project a uniform target distribution 24 onto a target area 20.

The MBS illuminator 10 uses a micro-refractive, Fresnel, segmented lens, mirror reflector or equivalent modifier to split the narrow beam into a fan' of beams with similar intensity and the resulting intensity shows a high degree of uniformity across the angle of illumination. This beam spread may have continuous or discrete beams depending on the method used to create the beam. As long as the beams are sufficiently close together the end result will provide sufficient uniformity that the resulting intensity distribution will be unaffected.

The basic functionality of the optical modifier can be demonstrated by comparing FIG. 2 to a relevant horizontal distribution plot such as FIG. 9a which plots approximate test results for a 20 degree divergence. Beam shaping films (BSF) 18 create additional beams at specific divergent angles from an original source beam 14. Two overlapped sheets of 20 degree BSF 18 produce −40 deg, −20 deg, 0 deg, 20 deg and 40 degree beam spreading which is illustrated by the locations of divergent beams in both figures. The irradiance curve for Beam 1 in FIG. 9a is equivalent to the source distribution 40 in FIG. 2. The second order beam spread 42 in FIG. 2 matches the left and right Beam 2's in FIG. 9a. Likewise, the third order beam spread 44 in FIG. 2 matches the left and right Beam 3's in FIG. 9a. The sum of this additively combined series of beams is plotted by the solid line labeled MBS Sum 20 Deg. By spreading the output of an array 22 of narrow beams 58 through sheets of BSF 18, a wider and more even distribution than the source distribution 40 is created, as is shown in FIG. 9a.

In this 20 degree example, the resultant distribution slightly exceeds the peak irradiance of a standard illuminator, and the average illumination is more evenly distributed. In order to quantify this second advantage, the PAR and FWHM rules can be used to derive an efficiency rating for the evenness of the illuminator distribution. Laboratory testing has shown that by creating both second 42 and third order beam spreads 44, the MBS illuminator 10 has an approximate PAR of 1.09, whereas a standard illuminator's PAR is 1.22. By understanding the principles of FWHM, one can calculate an efficiency rating for each resultant illumination curve, by taking the ratio of the sum of the average area under the curve to the half maximum line over the total area under the curve. This ratio can be thought of as the percentage of useful illumination over the total illumination projected. As can be seen in FIG. 3, for a 20 degree Horizontal irradiance, the efficiency of the MBS illuminator 10 is 95.3%, whereas a standard illuminator is 75.5%. This results in an increase of the efficiency of total light to the target area 20 of over 26%.

Even microdiffractive films, which produce elliptical Gaussian distributions across a scene, do not return the highest quality images possible, since their peak to average ratio (PAR) is still at least 1.25 to 1 across a scene. MBS illuminators produce much more even illumination across the scene with peak to average ratio in the range of 1.1 to 1 or less.

The main criteria of illumination for wide area lighting applications as well as for imaging applications is the uniformity of light energy over the scene. In addition to providing more useful light on scene for a given power input, MBS illuminators 10 substantially improve the Peak to Average illumination covering a target area 20. Note that although the peak illumination will be reduced, the average illumination will be significantly increased over FWHM FOI. Since the average illumination in the pass band region is used to calculate efficiency ratings, improvements in the region of 25% are possible. This shows that the average illumination is more important than the peak, which is achieved by flatter distribution curves above the FWHM line, and minimizing stop band energy waste.

Similar horizontal plots (FIGS. 7a/b & 8a/b) quantify similar outcomes for 60 and 30 degree sources respectively. For each source angle, these horizontal plots show the angular distribution of illumination energy in intensity or irradiance. The intensity graphs show how MBS illuminators are specifically tailored to deliver the desired irradiance to the target area 20 and achieve target distributions 24 that create optimal imaging results. Standard illuminators use simple optics which create Gaussian distributions that result in a relatively even intensity distribution, but very uneven irradiance distributions. Photographic and surveillance imaging applications rely on the uniformity of irradiance distributions for optimal outcomes. MBS 10 provides significant improvements in peak to average illumination over the target area 20 which creates the even and efficient irradiance distributions required.

Two simple analogies will be briefly discussed, as they demonstrate the validity of the beam spreading outcomes shown herein. An analogy to electronic signal filters is a single order band pass filter that produces a Gaussian signal similar to illuminators. In fact, there is a direct mathematical correlation between the behavior of light through an optical lens and an electronic signal through an electronic filter. Through the use of a higher order filter it is possible to generate a very flat band pass that provides sharp cutoff above and below the center frequency. Multiple beam shaping is essentially a higher order filter that produces a flatter pass band with steeper roll off in the spatial domain. This has the powerful combined effect of providing more even illumination across the scene and also not wasting nearly as much energy on the wings below 50% of peak.

A second analogy comes from the field of music, where the specific combination of multiple frequencies can create a new sound with a purer tone. As shown by the horizontal plots, a multiplicity of narrow beams 58 are combined through one or more beam shaping films 18, which create more even resultant distributions than a multiplicity of single sources. We will now discuss the vertical aspect of the multiple beam shaping illuminator 10.

Vertical Beam Spreading

The creation and use of asymmetric vertical distributions (i.e. not symmetric about the horizontal axis) can provide significant improvements in usable optical energy on scene. The COSEC^2 curve used in the UF500 reflector may be ideal to deliver uniform illumination from near foreground to the far background as described in U.S. Pat. No. 6,158,879. FIG. 10a/b to 12a/b illustrate the unique patterns of beam spreading that can result in an even and efficient distribution on scene.

Multiple beam shaping illuminators 10 generate uniform vertical illumination by using BSF 18 in ways similar to the horizontal method, by spreading each beam with different divergence weightings to achieve the desired effect. The horizontal divergence is not affected by spreading the beam vertically, and visa versa, so that the horizontal and vertical beam spreading methods may be applied simultaneously because the optical effects are additive. However, vertical beam spreading has unique requirements that are not present with horizontal beam spreading, in that a downward deflection is necessary in order to project illumination from a vertical surface downwards to the ground across long distances.

In FIG. 10a/b to 12a/b beams are labeled 1 to 5, where Beam 1 does not have any deflection and beams 2 to 5 have 1 to 4 times the downward deflection. The amount of energy delivered in each beam is proportional to the area of the source and each area is controlled separately with the sum of the 5 beam source area totaling the source area. The intensity distribution shows that Beam 1 is usually the highest output because it is usually pointed at a distance furthest from the illuminator. The illuminator profile in these examples has been selected so the irradiance over a region of interest from a particular illuminator mounting height and angle results in uniform illumination (lowest PAR) and highest efficiency.

Test data and projections from FIG. 4 show that the efficiency of over 90% can be achieved with MBS 10 in its vertical aspect at FWHM, and over 80% efficiency at FW.8M (80% of peak), and generate a PAR of 1.03:1. Compared to standard illuminators that typically have 75% efficiency at FWHM with a PAR 1.25:1 and less than 50% efficiency at FW.8M, the MBS 10 vertical distribution matches the efficiencies of the MBS 10 horizontal distribution.

The five beams used in the example were chosen to best demonstrate the optimal functionality as understood at the present time. As was the common beam deflection angle for each beam. In practice, any number of beams from two to a continuous distribution may be used and any beam angle and weight for each beam can be applied, in order to tailor the distribution to provide maximum illumination across the entire target area 20.

The close observer may notice that the peaks of both the standard and MBS resultant curves are offset from zero. The difference in offset is an artifact of the projected distance to the target area 20. Any of the vertical irradiance plots illustrate the impact of projecting an illuminator at an angle to the ground. The peak irradiance is no where near the peak intensity because the irradiance falls off with the square of the distance to the ground. This is a key factor which demonstrates that even though the 60 deg standard illuminator is aimed at 60 degree (intensity), the irradiance peak is only 20 degrees essentially very close to the source. This is a critical limitation of wide angle vertical illumination and the reason that elliptical Gaussian diffusers worked so well was because they reduced the vertical divergence to about 10 degrees which eliminates this hotspot in the foreground of the image. The following plots which compare vertical distance with irradiance (FIGS. 13b & 14a/b) and show how MBS 10 is superior to standard illumination methods by providing a considerably more even illumination pattern and project this pattern further into the distance for better range than a wide angle illuminator.

Multiple Beam Shaping

When both horizontal and vertical beam spreading are additively combined, the result is multiple beam shaping 10, which is illustrated by the 3D plots in FIG. 16a/b. Both show the MBS 10 intensities for horizontal angular divergence against vertical distance (m) from the illuminator. Distributions illustrated in FIG. 16a/b are located in the regions labeled target distribution 24 in FIG. 1a/b. This is the shaped distribution that bathes the target area with sufficient irradiance to return crisp surveillance images. While highway surveillance is one fairly straightforward application, MBS illuminator distributions can be tailored to fit a variety of mounting conditions and unique target areas 20 and desired irradiance patterns.

Given the wide range of lighting configurations possible when employing the MBS 10 illumination system, the following examples will serve to illustrate the basic or preferred embodiment. In the present implementation, a uniform field of irradiance is desired over a horizontal surface covering approximately 60 degrees horizontal and 60 degrees vertical. The basic principle is to use as narrow a source divergence as possible, in order to minimize light spill from the edges and improve efficiency. If discrete beams are used the angle between the beams should be substantially similar to the source divergence.

In this example of a 60 degree horizontal illumination field, we are using a 15 degree FWHM symmetric LED array as the distributed source. Horizontal beams spread at an angle of 12 degrees to give a beam angle to source divergence ratio of 0.8, which is optimum for this discrete beam configuration, and meets the horizontal FOI criteria. This combination produces a FWHM irradiance of 58 degrees with efficiency of 93.7% and PAR of 1.08:1. FW.8M is 50 degrees FOI, 85.0% efficiency and PAR of 1.03:1. There is some flexibility in choosing beam divergence and source divergence for particular applications, but this combination appears optimal.

Similarly, if one requires a 30 degree vertical illumination field, a 15 degree FWHM symmetric LED array is used as the distributed source. With a mounting height of 5 m and angle of 8 degrees from horizontal, the subsequent vertical beams spread at an angle of 28 degrees to give a beam angle to source divergence ratio of 1.866. This combination produces a FWHM irradiance of 62 degrees vertical with efficiency of 87.8% and PAR of 1.10:1. FW.8M is 52 degrees, efficiency is 76.3% and PAR is 1.04:1. Selecting other mounting angles may lead to other combinations of beam to source angle for optimum uniformity in the FOI.

Selected alternate embodiments of the MBS illumination system 10 will now be described in detail. Other embodiments are not ruled out or similar methods leading to the same result.

Beam shaping film (BSF) 18 is one method of creating multiple beams from a distributed light source. This is an easy-to-use and controllable method of generating precisely weighted beams of desired angle and relative intensity. Both the divergence angle and relative intensity are important to be able to generate the intensity pattern needed in order to create the target irradiance pattern desired. BSF 18 allows for one or two dimensional beam creation allowing for both horizontal and vertical beams.

The use of segmented reflectors is another method of creating multiple beam shaping from a distributed light source. The reflector can generate discrete or continuous beams by bending the light horizontally and or vertically. The amount of beam bending is controlled by the curvature or tilt of the segments and the beam weight is determined by the relative size of the particular segment of the mirror. Such a mirror may be created by stamping the base and then plating suitable reflective material onto the surface.

The use of a segmented refractor 64 (see FIG. 17) is another method of creating a multiple beam shaped light distribution. A diamond with a brilliant cut is an equivalent example of this type of lens, where the light coming in the bottom of the diamond is refracted out of the facets 66. The beam angle and beam weight are determined by the angle and size of each facet 66, respectively. Artificial methods, such as plastic injection molding, can be used to create diamond like lenses with beam angles, proportions, and similar properties of diffraction capable of creating multiple beam shaping from any distributed light source.

The refractive method of beam splitting uses a combination of plano-convex lens wedges providing compound facets to generate multiple beams of desired weight and angle for horizontal and or vertical intensity distributions. The MBS 10 segmented refractor 64 is positioned in front of the distributed light source such as an LED array. The divergence of the source creates overlapping intensity profiles from each facet to result in the desired intensity profile to deliver the required irradiance pattern on the target area. Both MBS 10 segmented reflectors and MBS 10 segmented refractors 64 can use discrete facets 66 to generate the multiple weighted beams from the source or they may use a continuous distribution that generates the required intensity profile for each unique target area.

Microdiffractive filters that create elliptical Gaussian distributions can also be cascaded with MBS illuminators, but in most cases they are not necessary because MBS 10 is a more effective light shaping method, and microdiffractors may reduce the resultant target intensity. The use of microdiffractive filter material is in fact not needed because we are able to generate a much better asymmetric patterns with tailored weighting to get the resultant beam shaping. If needed one could use microdiffractive filters to smooth the beam pattern but that would dilute the efficiency and evenness of the illumination. Microdiffractive filters correspond to a 10 degree vertical beam, with a 20, 30, 60 or wider horizontal beam. The main innovation of the microdiffractive filter was to build an asymmetric illumination profile, which is much more efficient than the circular symmetric' illumination of standard illuminators.

Other advantages of using the novel device over other methods or devices are described herein. With multiple beam shaping, we are able to generate any number of beams, with any relative weighting and in two directions ie both horizontal and vertical patterns in order to create any illumination profile desired.

MBS illuminators extend lighting performance by making better use of the energy available. By getting more energy on scene we have significant gains in efficiency and actual output because more of the light is directed onto the area of interest, typically represented by the area inside the FWHM angle. The wings' in Gaussian curve for standard illuminators represent wasted energy either being sent up to the sky or directed to the ground whereas MBS shaped illumination takes almost all the energy and directs it to the area of interest. Furthermore the energy distribution inside the FWHM angle 48 of the curve is structured to create a much more even irradiance than that of standard illuminators. And MBS illumination gets even more efficient as the beam width is narrower because this allows a further reduction in waste energy outside the FWHM angle 48.

In order that MBS illuminators 10 provide their exceptionally even and efficient shaped illuminations, especially in the vertical aspect, they need to be carefully matched to their applications. There is no one MBS pattern that will work for a wide range of mounting angles, but the advantage of MBS 10 is that it can easily be tailored to the specific target area 20, as well as the requirements of the imaging equipment.

The horizontal and vertical illumination distributions and intensities produced by MBS 10 are unique in that they are constant across the field of illumination with a steep dropoff at the edge of the field. The pattern can be shaped (modified) to provide any illumination distribution to match application requirements from narrow 10 degree illumination suitable for long range applications to 180 degree illumination for very wide field of view, multiple cameras or moving camera applications.

The output of an LED array with a matching array of individual focusing lenslets aligned to each LED, can be modified by one or more beam shaping films (BSF), a segmented reflector, or a segmented refractor. In the latter case however, another solution is possible, namely that the lenslet array can be directly embedded into the rear of the segmented refractor as a combined mold.

Figure 18:
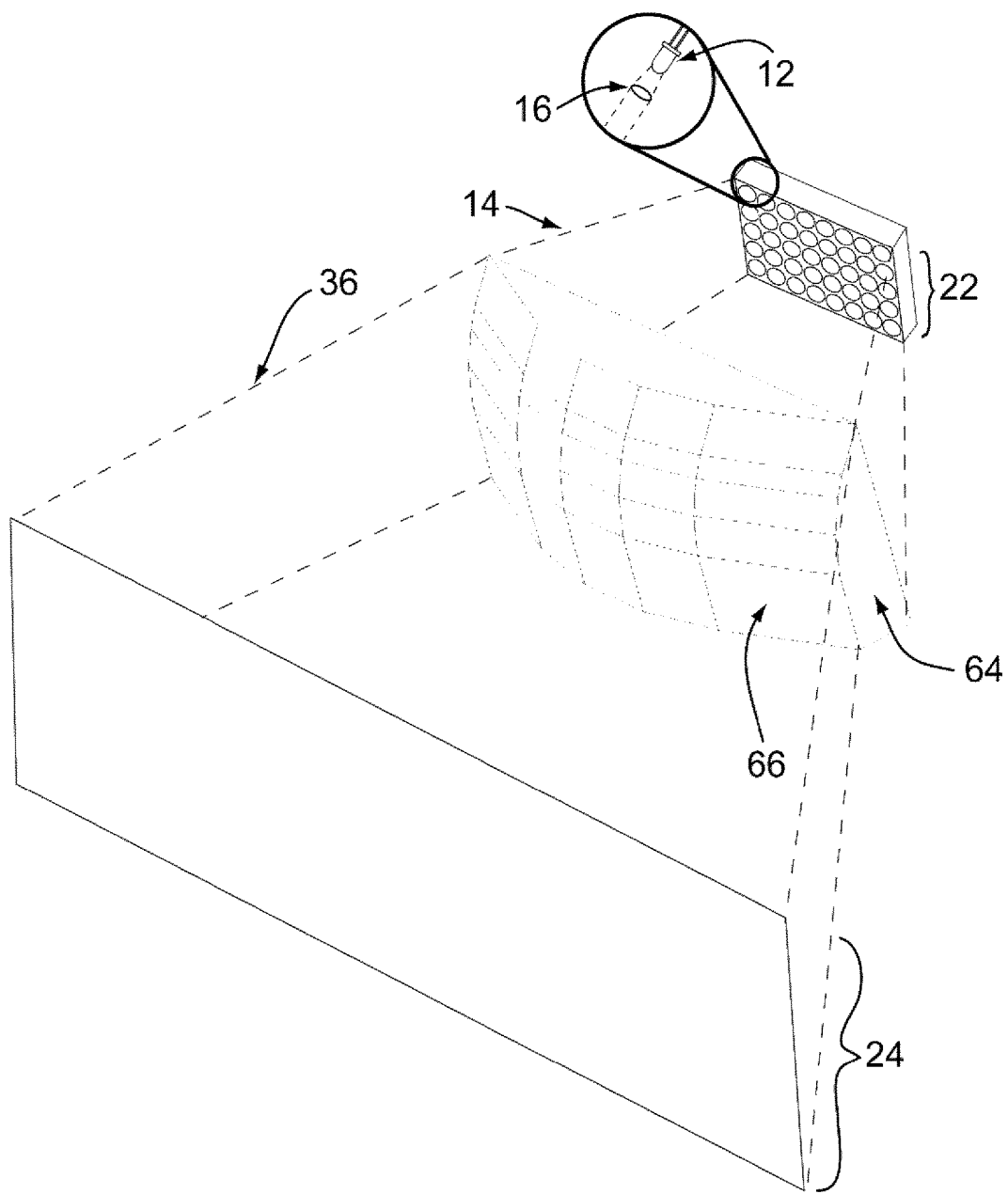
FIG. 18 Isometric view of a segmented refractor with a source array (alternate embodiment).

The molded segmented refractor in FIG. 18 is a faceted lens used to create multiple 'beams' that project unique horizontal and vertical light distribution on the target. This approach to optical lens design is a departure from classical cylindrical optics where there is a central axis of cylindrical symmetry. There can be as many optical axes as there are beams so it is able to produce incredibly even illumination. This variation also allows the design of specific illumination profiles to suit particular applications. The segmented refractor in FIG. 18 shows a matrix of 5 horizontal and 5 vertical rows that combine to produce 25 beams. In practice a larger number of beams may be used to deliver more uniform or unique illumination patterns.

Figure 19:
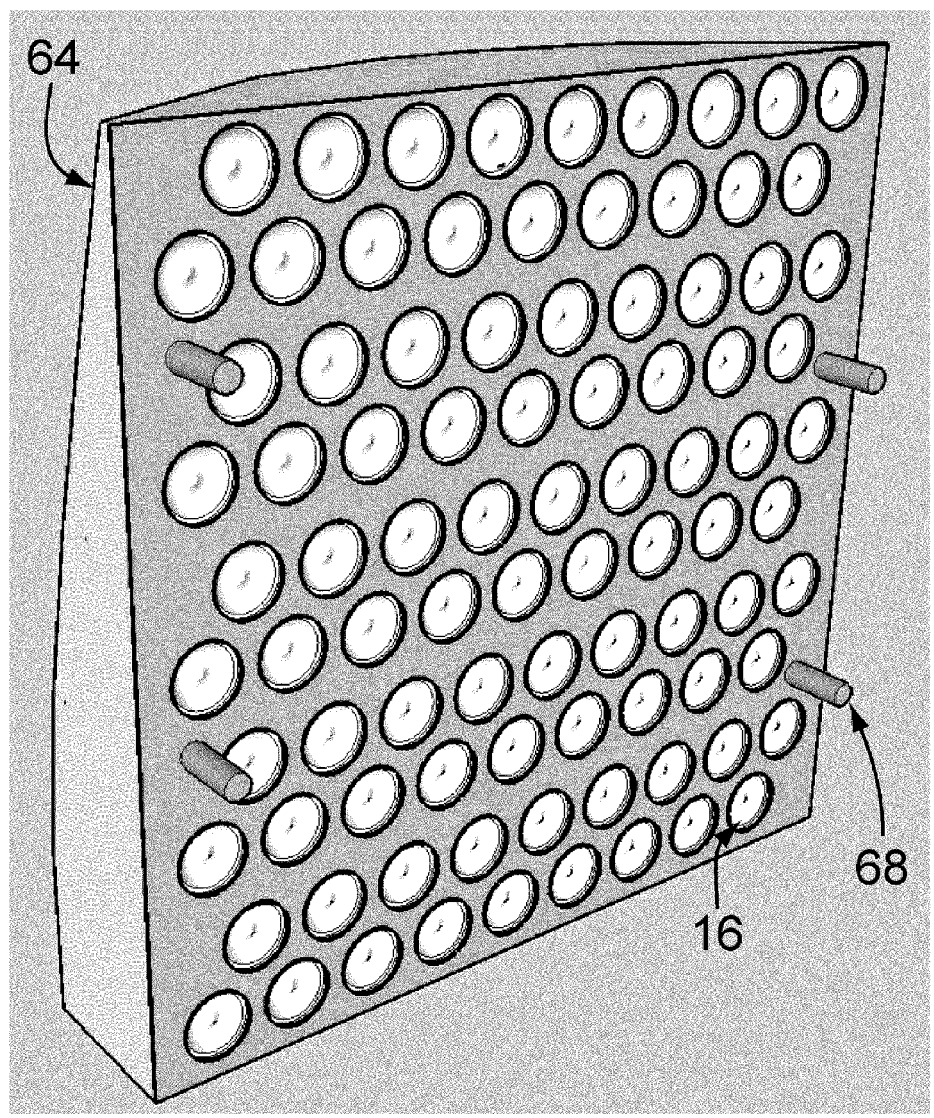
FIG. 19 Isometric view of a segmented refractor with an embedded lenslet array (alternate embodiment).
Figure 20:
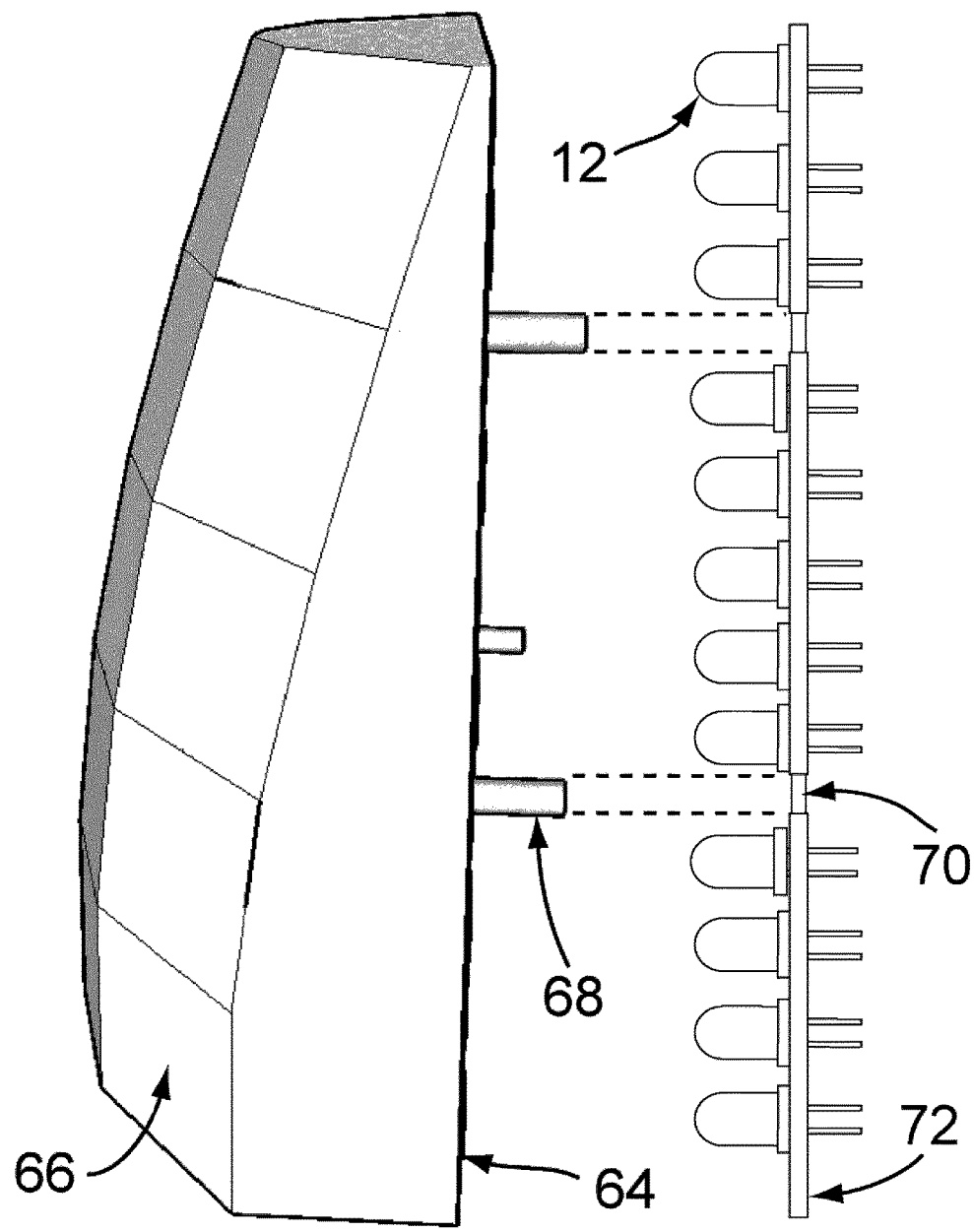
FIG. 20 Isometric view of a segmented refractor with an embedded lenslet array & an LED PCB (alternate embodiment).

The core Multiple Beam Shaping illumination innovation centers on the creation of unique illumination patterns on a target area based using multiple weighted and directed beams and discloses several arrangements for creating these multiple beams. A key aspect of the significant properties of the MBS illuminator is derived from the narrow divergence of the initial Gaussian beam. In effect, the narrower the initial beam, the higher the efficiency of the resultant illumination. Since a LED starts out as a Lambertian source a refractive lens must be used to create a narrow beam from each LED. The refractive lens reshapes the light beam from each device in source array into a narrower divergence pattern typically about 10 degrees FWHM while retaining Gaussian shape with the peak in the center. As shown in FIG. 18, these refractive lenses can be small enough (e.g. the "lenslet" 16) to be molded either directly onto the LED 12, onto an LED array circuit board frame 22 in front of each respective LED, molded into the back of the segmented refractor (as shown in FIGS. 19 and 20) or a combination of these arrangements. The source beam that results from the lenslets then proceeds through each facet 66 segmented refractor 64 to become the illumination path 36, thereby customized for the target distribution 24.

The variations shown in FIGS. 18-20, which have a 'primary optic' lens element for each LED, are useful where the multiple beam shaping segmented refractor 64 is a one-piece molded unit.

There are several advantages realized by combining the refractive primary lens elements into the molded lens as shown in FIGS. 19 and 20: a higher efficiency is possible since there are fewer optical elements in the path. This approach will also yield a lower cost of manufacture since there are fewer parts required in the system. The molded segmented refractor 64 must be aligned or 'registered' closely with the position of the LEDs in order to work properly. This can be achieved through any number of ways commonly used to mount and align a single lens element in front of a solid state light source. One such method of alignment would be to use machined holes (such as at 70) in the surface of the LED array circuit board 72 that match with corresponding protruding 'pins' (such as at 68) in the segmented refractor 66.

Figure 21:
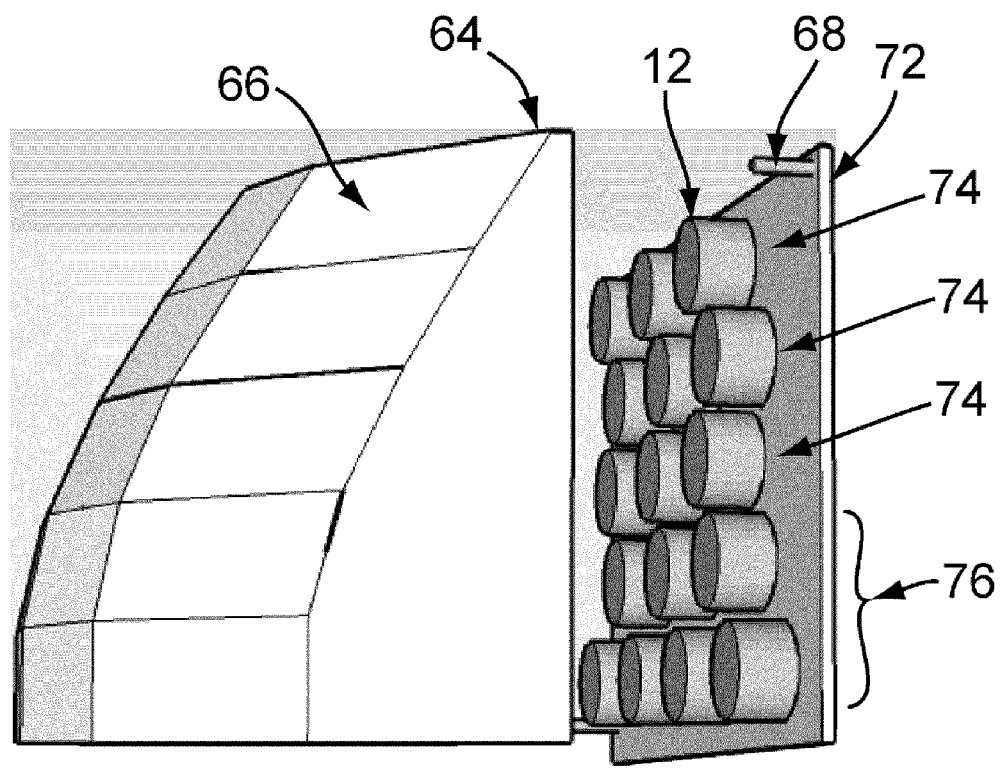
FIG. 21 Isometric side view of a segmented refractor with an embedded lenslet array & an LED PCB with variable intensity foreground & background groups (alternate embodiment).
Figure 22:
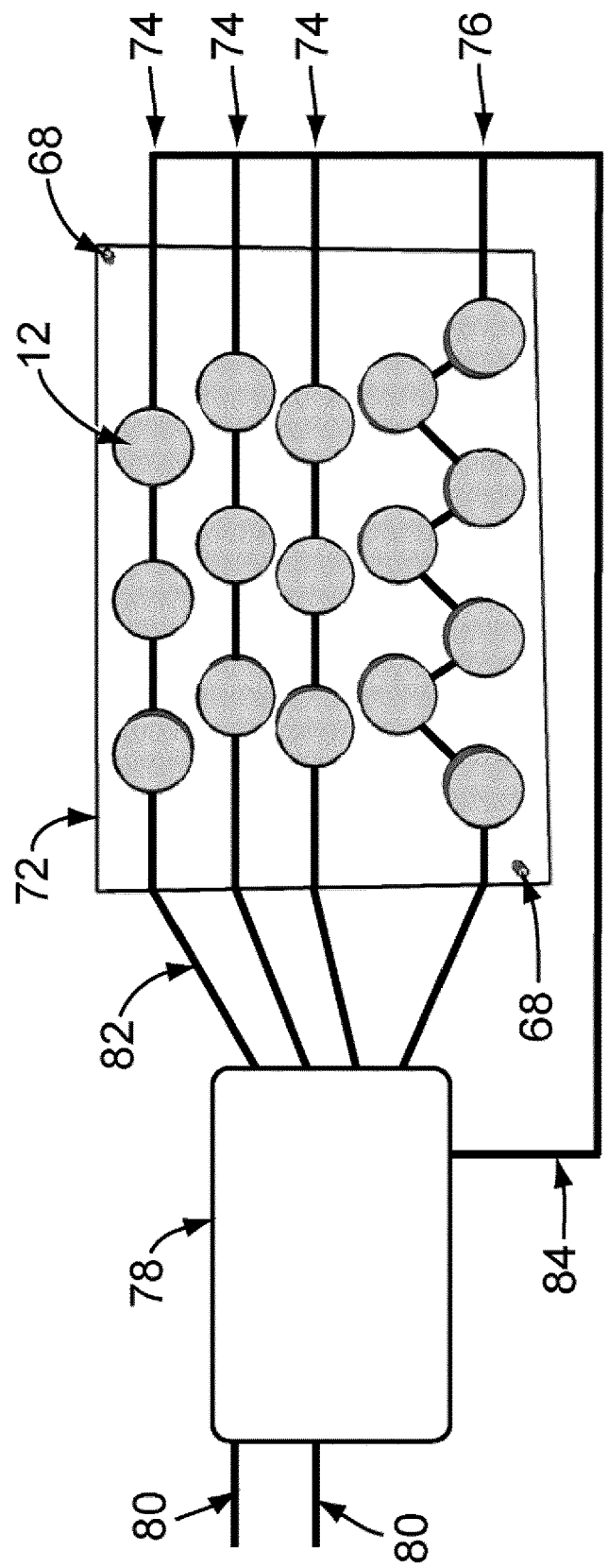
FIG. 22 Schematic of the LED PCB with variable intensity foreground & background groups and LED driver circuitry shown in FIG. 21 (alternate embodiment).

An additional embodiment, as shown in FIG. 21, employs multiple channel outputs of an LED driver 78 such that the relative light output of each group of driven LEDs is varied, which then alters the shape of the resultant intensity profile (distribution). The main beam of an illuminator using a segmented refractor 64, in which the majority of the light energy is concentrated to remain at optimal power, varies the intensity of a background group 76 of LEDs, as shown. By varying the intensity of individual foreground groups 74 of LEDs, the resultant distribution can be adjusted higher or lower as needed. Changing the relative output of the groups of LEDs in the beams allows for an electronic adjustment to the aim of the illuminator to create optimal irradiance distribution over target area.

Typically the electronic aiming would be done across the vertical beams with the horizontal beam relative weights remaining unchanged. The present alternate embodiment allows the illuminator angle of peak intensity to be adjusted as mounted to suit a particular mounting height and orientation. Since there is a spatial correlation between groups of LEDs and the resultant illuminator intensity profile, the illumination intensity pattern can be changed by varying the drive current of each group of LEDs.

For example, an illuminator with four horizontal and four vertical groups of beams has the background group 76 comprised of seven LEDs, and the remaining three foreground groups 74 are comprised of three LEDs each. By varying the drive current through the three foreground groups 74, their intensity pattern can be varied, which varies their resultant distribution, which therefore allows electronic adjustment to different illuminator mounting heights and orientations while maintaining optimum irradiance distribution.

Figure 23A:
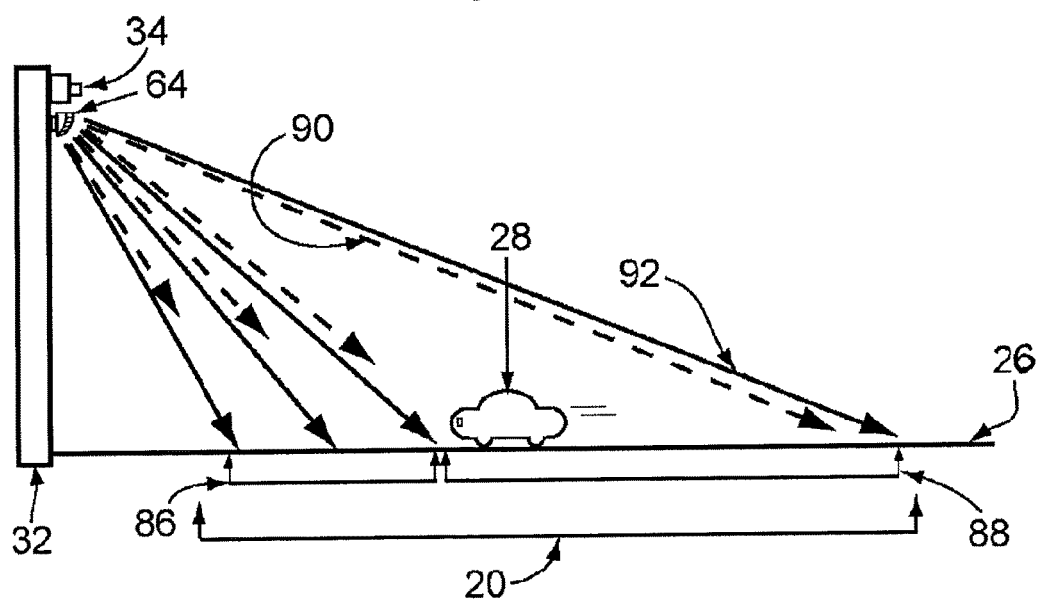
FIG. 23a Vertical Intensity Profile of standard LED array and adjustable LED groups (alternate embodiment from FIGS. 21 & 22).

In FIG. 1a, if the range to the target area 20 is varied widely, the target distribution becomes less than optimal. FIG. 23a demonstrates how by varying the intensity of the foreground groups 74 of LEDs employing a segmented refractor 64, the foreground distribution 86 is optimized for the new distance. In this example, as the vehicle 28 travels towards the surveillance camera 34, the optimal irradiance on target can be maintained, by controlling the output of the foreground LED groups, as contrasted with the output of a standard (non-variable) segmented output 90.

Figure 23B:
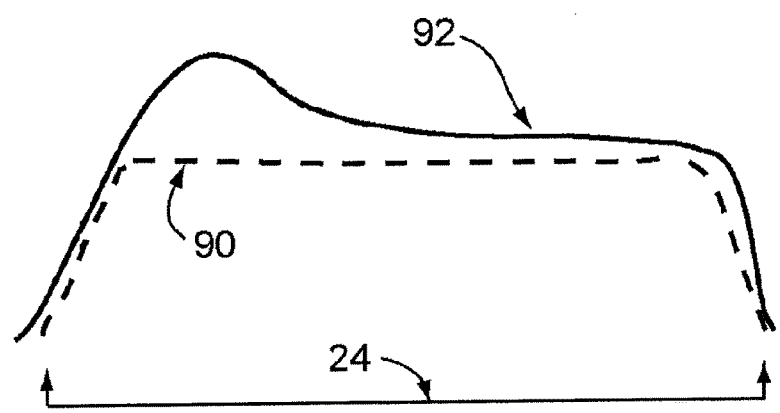
FIG. 23b Resultant Irradiance Profile on target area using standard LED array and adjustable LED groups (alternate embodiment from FIGS. 21 & 22).

In detail, FIG. 23a shows one side of a bridge overpass 32, on which is mounted a surveillance camera 34, and an exposed (for illustration purposes only) segmented refractor 64, projecting illumination onto a target area 20. The length of the hatched arrows directed towards the foreground distribution 86, represent the intensity projected by each foreground group 74 of LEDS, as projected by a standard (non-variable) segmented output 90. The hatched arrow directed towards the limit of the background distribution 88, represent the intensity projected by the background group 76 of LEDs, as projected by a standard (non-variable) segmented output 90. Solid arrows signify the use of an adjustable segmented output 92, and demonstrate, by their length, that more light is projected to the foreground distribution 86. FIG. 23b shows the resultant irradiance profile of standard 90 vs adjustable 92 segmented outputs, and demonstrates that there is an increased irradiance in the foreground distribution 86 area of the total target distribution 24. The consequence of this targeted illumination profile is that a vehicle 28 travelling towards a surveillance camera 34 across an extended range, will be optimally illuminated with consistent irradiance during the entire window of visibility.

The foregoing descriptions of various embodiments and methods of installation should be considered as illustrative only, and not limiting. Other techniques and other materials, components, or equivalent devices may be employed towards similar ends. Various changes and modifications will occur to those skilled in the art, without departing from the true scope of the invention as defined in the above disclosure, and the following claims.

We claim:

1. A multiple beam shaping illumination system, for increasing uniformity of irradiance upon a selected target area, the multiple beam shaping illumination system comprising:
    a beam shaper which receives input distributions of light from at least one light source and emits output distributions of light having output pathway angles different than corresponding input pathway angles, the output distributions of light having essentially Gaussian intensity profiles;
    the beam shaper including a multiplicity of light passage facets for a corresponding multiplicity of output distributions of light, at least two such facets being angled with respect to one another to effect a complementary overlapping of adjacent output distributions of light;
    wherein the complementary overlapping has a light intensity as great as the peak intensity of an adjacent one of the multiplicity of output distributions of light.

2. The multiple beam shaping illumination system of claim 1, in which the beam shaper refracts some output distributions of light more than other output distributions of light, to provide a particular overall output beam shape.

3. The multiple beam shaping illumination system of claim 2, in which
    a) the beam shaper is a plurality of sheets of micro-refractive film;
    b) the multiplicity of light sources is a planar array of LEDs;
    c) the primary optic lenses are mounted to an LED array frame in front of the LEDs;
    d) the beam shaper is shaped and positioned to emit a plurality of output light paths from a plurality of planar arrays of LEDs;
    e) the primary optic lenses are mounted to an LED array frame in front of the LEDs;
    f) alignment pins and alignments holes are used to position the segmented refractor with respect to the multiplicity of light sources.

4. The multiple beam shaping illumination system of claim 2, in which
    a) a current control module controls different electrical currents driving individual light sources to vary light output intensity among the individual light sources and to change thereby a resultant overall illumination beam shape;
    b) there are multiple channels of light source current drive and the channels are controlled in light source groups to change relative light output of different light source groups, thereby providing change in shape of overall beam intensity profile;
    c) a majority of light sources are controlled to draw optimal electrical power for a selected target area, but groups of individual LEDs used primarily for illumination of a foreground portion of the target area beams are controlled to draw less electrical power and provide less intense light output, thereby providing an electronic adjustment and aim for the beam shaper;
    d) electronic control of light source drive current is performed across vertical groups of light sources while drive current across horizontal groups of lights sources remains constant, thereby providing an electronic adjustment to the illuminator angle of mount to suit a camera and lens combination.

5. The multiple beam shaping illumination system of claim 1, in which the light source is a near-point source and the distribution of light is obtained from the near-point source using one of a refractive lens or a micro-refractive material.

6. The multiple beam shaping illumination system of claim 5, in which the individual light sources are LEDs.

7. The multiple beam shaping illumination system of claim 5, in which the multiplicity of individual light sources is a planar array of LEDs.

8. The multiple beam shaping illumination system of claim 6, in which the primary optic lenses are mounted to an LED array frame in front of the LEDs.

9. The multiple beam shaping illumination system of claim 5, in which the primary optic lenses are mounted on the light sources.

10. The multiple beam shaping illumination system of claim 1, in which there is a multiplicity of individual light sources and a corresponding multiplicity of primary refractive optic lenses positioned to narrow each of a corresponding multiplicity of individual source light beams.

11. The multiple beam shaping illuminating system of claim 10, in which a current control module controls different electrical currents driving individual light sources to vary light output intensity among the individual light sources and to change thereby a resultant overall illumination beam shape.

12. The multiple beam shaping illuminating system of claim 10, in which there are multiple channels of light source current drive and the channels are controlled in light source groups to change relative light output of different light source groups, thereby providing change in shape of overall beam intensity profile.

13. The beam shaping illuminating system of claim 10, in which a majority of light sources are controlled to draw optimal electrical power for a selected target area, but groups of individual LEDs used primarily for illumination of a foreground portion of the target area beams are controlled to draw less electrical power and provide less intense light output, thereby providing an electronic adjustment and aim for the beam shaper.

14. The beam shaping illuminating system of claim 10, in which electronic control of light source drive current is performed across vertical groups of light sources while drive current across horizontal groups of lights sources remains constant, thereby providing an electronic adjustment to the illuminator angle of mount to suit a camera and lens combination.

15. The multiple beam shaping illumination system of claim 1, in which the beam shaper is shaped and positioned to emit an output light path having an angle of distribution wider than a corresponding angle of the light source distribution.

16. The multiple beam shaping illumination system of claim 1, in which the beam shaper is a micro-refractive material.

17. The multiple beam shaping illumination system of claim 16, in which the micro-refractive film has different micro-refracting components embedded in prescribed proportions to achieve a predetermined weighting of different Gaussian beam patterns of input light to provide the particular overall output beam shape.

18. The multiple beam shaping illumination system of claim 1, in which the beam shaper is a plurality of sheets of micro-refractive material.

19. The multiple beam shaping illumination system of claim 1, in which the beam shaper is a segmented refractor having multiple facets or multiple focal lengths.

20. The multiple beam shaping illumination system of claim 19, in which the primary optic lenses are mounted on a rear surface of the segmented refractor.

21. The multiple beam shaping illumination system of claim 19, in which alignment pins and alignments holes are used to position the segmented refractor with respect to the multiplicity of light sources.

22. The multiple beam shaping illumination system of claim 1, in which the beam shaper is shaped and positioned to emit a plurality of output light paths from a plurality of planar arrays of LEDs.

23. The multiple beam shaping illumination system of claim 1, in which at least some of the beam shaper's facets are adjustably hinged with respect to each other.

24. The multiple beam shaping illumination system of claim 23, in which the beam shaper's facets that are adjustably hinged with respect to each other have attached thereto a bank of LEDS that can thereby be pivoted.

* * * * *